US012240703B2

(12) United States Patent
MacLachlan et al.

(10) Patent No.: US 12,240,703 B2
(45) Date of Patent: Mar. 4, 2025

(54) MODULAR CONVEYOR BELT WITH DEDICATED ACCESS MODULE

(71) Applicant: Laitram, L.L.C., Harahan, LA (US)

(72) Inventors: Gilbert J. MacLachlan, Harahan, LA (US); Angela Longo Marshall, Harahan, LA (US); Kevin W. Guernsey, Destin, FL (US); Benson Hall, Harahan, LA (US); Matthew Vulpetti, Metairie, LA (US); Jonathan J. Bishop, Amite, LA (US); Jacob Govert Vermeiden, Zwolle (NL); Andrzej Jacek Gonera, Lodz (PL)

(73) Assignee: Laitram, L.L.C., Harahan, LA (US)

( * ) Notice: Subject to any disclaimer, the term of this patent is extended or adjusted under 35 U.S.C. 154(b) by 37 days.

(21) Appl. No.: 18/029,438

(22) PCT Filed: Sep. 30, 2021

(86) PCT No.: PCT/US2021/052781
§ 371 (c)(1),
(2) Date: Mar. 30, 2023

(87) PCT Pub. No.: WO2022/072581
PCT Pub. Date: Apr. 7, 2022

(65) Prior Publication Data
US 2023/0356949 A1 Nov. 9, 2023

Related U.S. Application Data

(60) Provisional application No. 63/086,204, filed on Oct. 1, 2020.

(51) Int. Cl.
*B65G 17/08* (2006.01)
*B65G 17/40* (2006.01)

(52) U.S. Cl.
CPC ............. *B65G 17/08* (2013.01); *B65G 17/40* (2013.01)

(58) Field of Classification Search
CPC .................................. B65G 17/08; B65G 17/40
(Continued)

(56) References Cited

U.S. PATENT DOCUMENTS 4,138,011 A * 2/1979 Lapeyre ................. B65G 17/08
198/844.2
4,361,364 A 11/1982 Brunn
4,365,848 A 12/1982 Grilli et al.
(Continued)

FOREIGN PATENT DOCUMENTS

EP      0083119 A1   7/1983
EP      2729390 B1   9/2016
(Continued)

OTHER PUBLICATIONS

European Search Report, European Patent Application No. 21876448.8, dated Nov. 27, 2024, European Patent Office; Munich, Germany.

*Primary Examiner* — Mark A Deuble
(74) *Attorney, Agent, or Firm* — Catherine M. Bishop

(57) ABSTRACT

A dedicated access module inserted between standard conveyor belt modules in a conveyor belt forms a dedicated opening and closing point for the conveyor belt. The dedicated access module comprises two mating portions, each portion including standard, articulating hinge elements on an outside end and non-articulating connection means on an inside end for connecting to the other, corresponding mating portion.

21 Claims, 33 Drawing Sheets

(58) Field of Classification Search
USPC ......................................................... 198/853
See application file for complete search history.

(56) References Cited

U.S. PATENT DOCUMENTS

| | | | |
|---|---|---|---|
| 4,636,014 A | 1/1987 | Dennison et al. | |
| 5,246,100 A * | 9/1993 | Stone | F16G 3/00 |
| | | | 198/844.2 |
| 5,377,819 A | 1/1995 | Horton et al. | |
| 5,507,383 A * | 4/1996 | Lapyere | B65G 17/08 |
| | | | 198/853 |
| 6,305,530 B1 * | 10/2001 | Guldenfels | B65G 17/08 |
| | | | 198/853 |
| 6,412,625 B2 * | 7/2002 | Damkjaer | B65G 23/06 |
| | | | 198/853 |
| 6,412,887 B1 | 7/2002 | Ketting et al. | |
| 6,474,464 B1 * | 11/2002 | Horton | B65G 17/08 |
| | | | 198/853 |
| 6,986,420 B2 | 1/2006 | Weiser et al. | |
| 7,721,877 B2 | 5/2010 | Maine, Jr. et al. | |
| 7,722,492 B2 | 5/2010 | Santos | |
| 8,695,790 B2 * | 4/2014 | Ridgell | F16G 3/02 |
| | | | 198/844.2 |
| 10,118,766 B2 | 11/2018 | Perdue et al. | |
| 12,043,491 B2 * | 7/2024 | Vulpetti | B65G 17/40 |
| 2003/0085106 A1 | 5/2003 | Corley et al. | |
| 2006/0006051 A1 * | 1/2006 | Guernsey | B65G 17/08 |
| | | | 198/853 |
| 2006/0054469 A1 | 3/2006 | Guldenfels et al. | |
| 2010/0065405 A1 | 3/2010 | Lagneaux | |
| 2014/0326584 A1 | 11/2014 | Visconti et al. | |
| 2015/0076040 A1 | 3/2015 | Dettmer et al. | |

FOREIGN PATENT DOCUMENTS

| | | |
|---|---|---|
| EP | 3318515 A1 | 5/2018 |
| WO | 2020163270 A1 | 8/2020 |

* cited by examiner

DETAIL B

DETAIL B

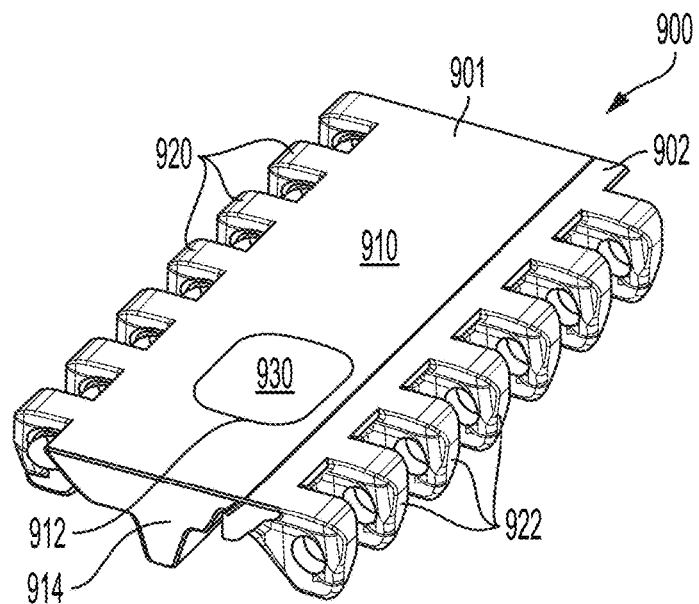
FIG. 39
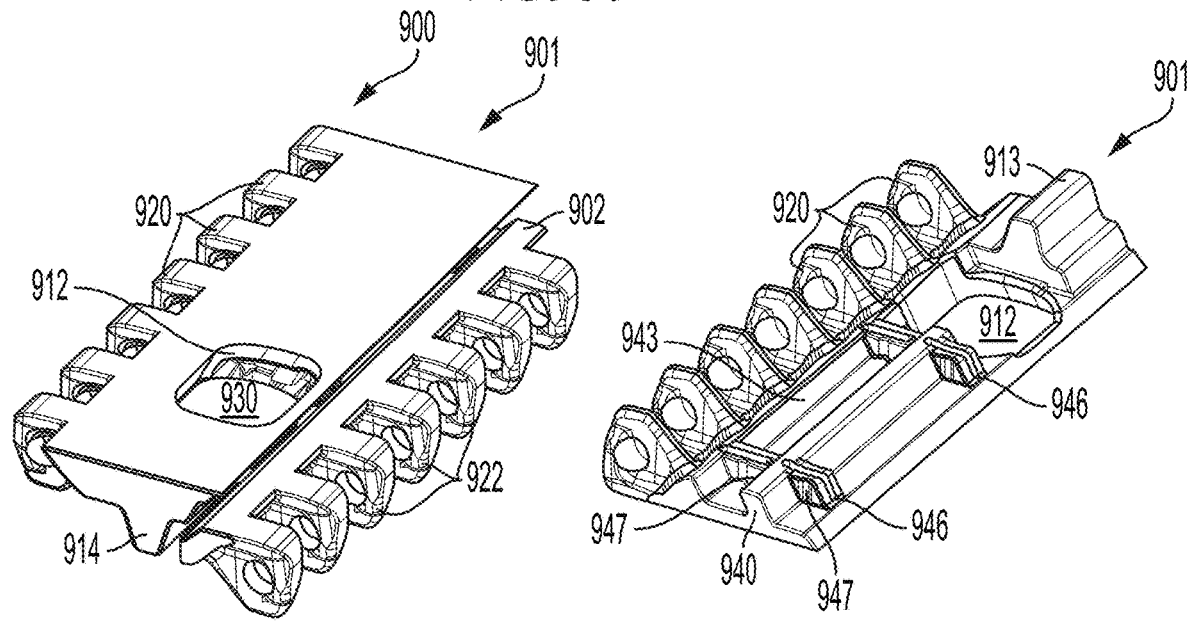
FIG. 40
FIG. 41

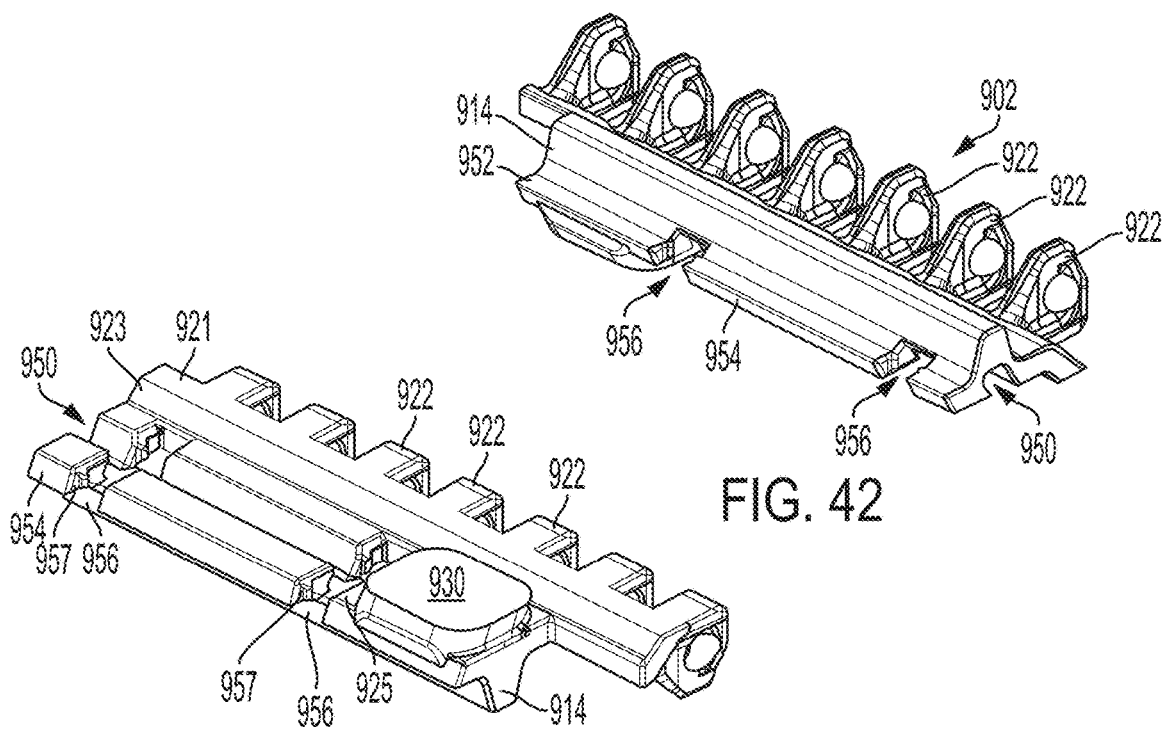
FIG. 42
FIG. 43
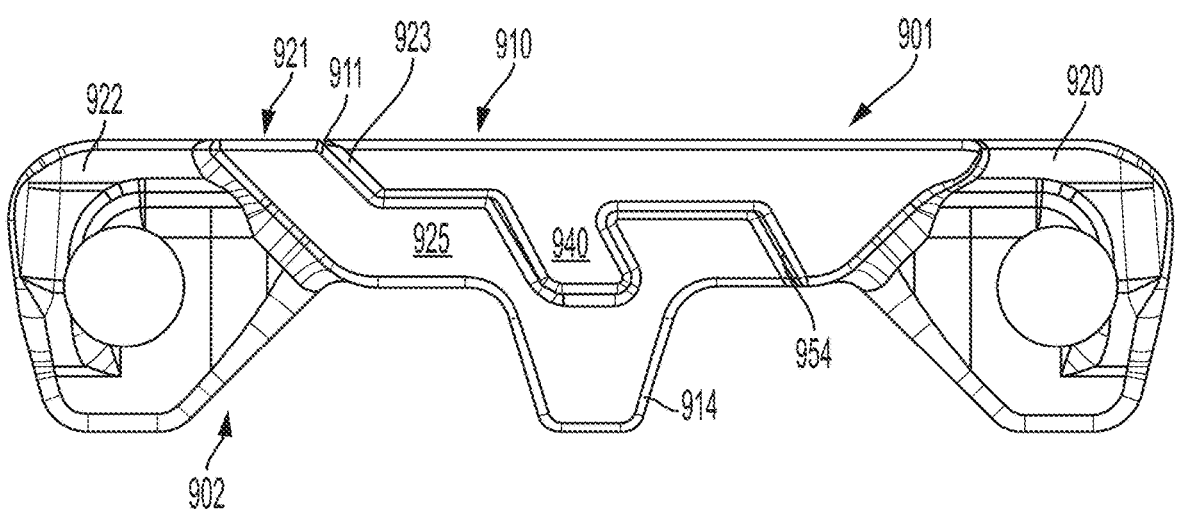
FIG. 44

MODULAR CONVEYOR BELT WITH DEDICATED ACCESS MODULE

RELATED APPLICATIONS

The present application claims priority to US Provisional Patent Application 63/086,204, filed Oct. 1, 2021 and entitled "Modular Conveyor Belt with Dedicated Access Module", the contents of which are herein incorporated by reference.

FIELD OF THE INVENTION

The present invention relates to the field of power-driven conveyors. More particularly, the present invention relates to a modular conveyor belt with a dedicated access module for easily separating and reconnecting the modular conveyor belt at a dedicated location.

BACKGROUND OF THE INVENTION

Modular plastic conveyor belts are widely used in various industries to convey products. Modular plastic conveyor belts are constructed of a series of rows of linked belt modules. Hinge elements along opposite ends of each row interleave with hinge elements of consecutive rows. A hinge rod inserted in the interleaved hinge elements connects the rows together at hinge joints into an endless conveyor belt loop, allowing articulation of articulation of the modules relative to each other.

Dedicated access modules can be used in certain locations throughout the length of a conveyor belt to allow an operator to easily separate the belt, make repairs or remove sections, and then reconnect the belt without the need for replacement components or special tools.

SUMMARY OF THE INVENTION

A dedicated access module for a conveyor belt comprises two mating portions, each portion including standard, articulating hinge elements on an outside end and non-articulating connection means on an inside end for connecting the mating portions to the other, corresponding mating portion without requiring external tools. The mating portions form a complete module within the conveyor belt. The dedicated access module facilitates opening and rejoining of the conveyor belt at one or more dedicated locations.

According to one aspect, a dedicated access module for a conveyor belt comprises a first mating portion having a first set of articulatable hinge elements at an outer end and a first non-articulatable connection element at an inner end and a second mating portion having a second set of articulatable hinge elements at an outer end and a second non-articulatable connection element at an inner end configured to engage the first non-articulatable connection element. The first mating portion engages the second mating portion to form a dedicated access module having a top conveying surface and an opposite bottom surface having a laterally-extending drive element for engaging a drive for the conveyor belt.

According to another aspect, a conveyor belt comprises a plurality of hingedly connected standard hinge modules, each having a drive element at a selected pitch for engaging a drive to drive the conveyor belt and a dedicated access module for opening and-or closing the conveyor belt. The dedicated access module comprises two mating portions joined together via a non-articulatable connection means. The dedicated access module has first articulatable hinge elements on a first end for connecting to a first standard hinge module, second articulatable hinge elements on a second end for connecting to a second standard hinge module and a drive element at the selected pitch.

BRIEF DESCRIPTION OF THE FIGURES

FIG. 39 is an isometric view of a dedicated access module comprising snap-together upper and lower mating portions forming a thumb pad for opening the dedicated access module;

FIG. 40 shows the dedicated access module of FIG. 39 during disassembly;

FIG. 41 is a bottom view of the upper mating portion of the dedicated access module of FIG. 39;

FIG. 42 is a bottom view of the lower mating portion of the dedicated access module of FIG. 39;

FIG. 43 is a top view of the lower mating portion of FIG. 42;

FIG. 44 is a cross-sectional view of the dedicated access module of FIG. 39;

DETAILED DESCRIPTION

A modular conveyor belt comprising a plurality of hingedly connected modules forming an endless loop includes a dedicated access module for easily separating and joining the belt at a dedicated location for cleaning, repair or removal. The invention will be described below relative to certain illustrative embodiments, though those skilled in the art will recognize that the invention is not limited to the illustrative embodiments.

Figure 1:
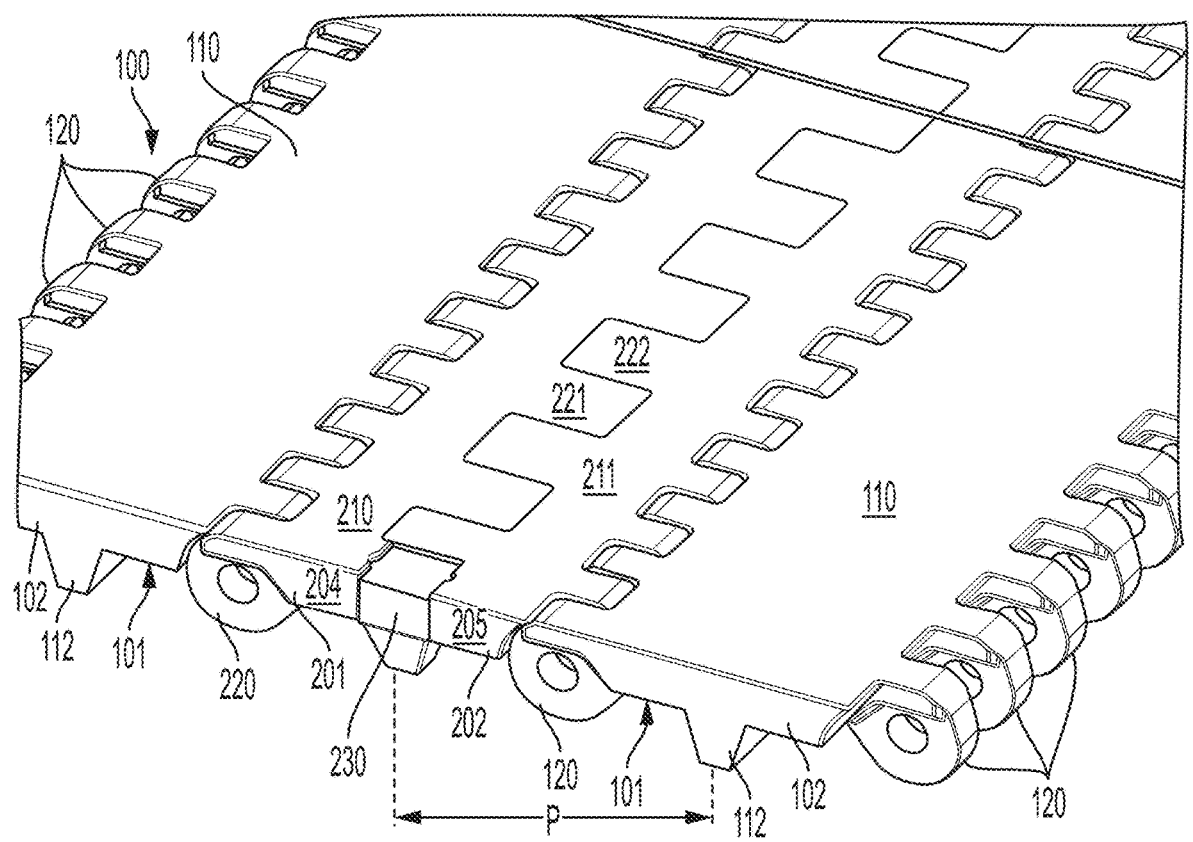
FIG. 1 is an isometric view of a dedicated access module between two standard conveyor belt modules in a conveyor belt according to an embodiment.
Figure 2:
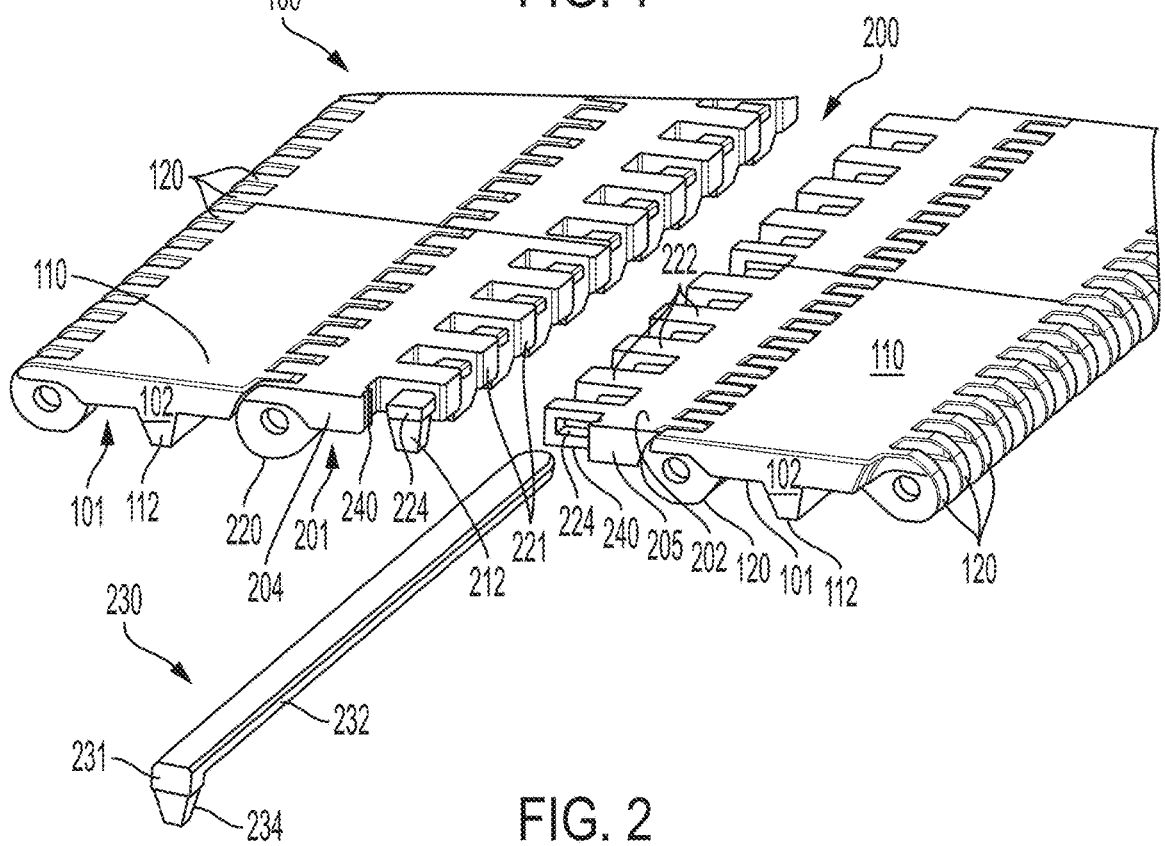
FIG. 2 is an isometric view of the dedicated access module of FIG. 1 in an open position.

Referring to FIGS. 1 and 2, an illustrative modular conveyor belt 100 comprises a series of hingedly connected standard conveyor belt modules 101 forming a top conveying surface and having ends joined together to form a continuous loop that is driven by a drive, such as a sprocket. The modular conveyor belt 100 is made up of a series of rows, with each row consisting of a single conveyor belt module defining the width of the belt or multiple modules arranged side-by-side, typically in a brick-lay pattern from row to row, across the width of the belt. Examples of suitable modular conveyor belts are those manufactured and sold, for example, by Intralox, Inc. of Harahan, La., USA. The belt modules are conventionally made by injection-molding thermoplastic materials such as polypropylene, polyethylene, acetal, nylon, or composite polymers, to name a few.

Each standard conveyor belt module 101 comprises a body 102 extending in thickness from a top conveying surface 110 to an opposite surface, which may include a drive element, such as a drive tooth 112, for engaging a conveyor drive, such as a sprocket. The standard module 101 extends in width from a first side to a second side and in length in a direction of belt travel from a first end to a second end. A series of linking elements, shown as spaced-apart hinge elements 120, extend longitudinally outward from each end of the standard module body. The hinge elements 120 on one end of the module body are laterally offset from the hinge elements 120 at the other end. The gaps between laterally consecutive hinge elements are sized to receive the hinge elements of modules in an adjacent row of modules in the conveyor belt, such that the openings in the hinge elements align to form a hinge passageway extending along a hinge axis. Hinge rods (not shown) extending laterally through the hinge passageways formed by the aligned openings in the interleaved hinge elements connect the modules to each other.

The hinge elements 120 allow articulation of the modules relative to each other about the hinge rods, enabling the conveyor belt to conform to the sprocket or other belt-guiding devices. The distance between consecutive hinge axes is defined as the belt pitch P, which is also the distance between consecutive drive elements 112. Each standard conveyor belt module 101 includes articulating hinge elements 120 at each end.

The modular conveyor belt 100 conveys articles atop the conveying surfaces 110 of the modules along an upper carryway portion of the conveyor. The belt is trained around sprockets (or other reversing structure) mounted on each end of the carryway, and returns along a returnway below the carryway. Such standard conveyor belt modules 101 are known in the art and are not limited to the illustrative flat-top modules. One skilled in the art will recognize that the body 102 may comprise any suitable configuration, and is not limited to the illustrative embodiment. For example, the body 102 may comprise planar structure that is solid, perforated, "open grid," flat, shaped or otherwise configured.

In one or more select locations, a dedicated access module 200 is inserted between two standard modules 101 to provide a dedicated opening point and-or re-connecting point for the conveyor belt. The dedicated access module 200 has a different connection means than the standard modules, so it can be opened and-or closed without tools and without requiring removal of the hinge rod(s).

The illustrative dedicated access module 200 comprises two half portions 201, 202, each connected to a standard module 101 at an outer end. The half portions mate 201, 202 to each other using a non-articulating connection means that is different from the articulating hinged connection of the standard modules using hinge elements and hinge rods so that the dedicated access module 200 is rigid across its length. When connected, the size, shape and pitch of the dedicated access module 200 is substantially the same as a standard module 101. In one embodiment, the dedicated access module can be a different color from the standard modules or contain indicia, such as signs, words or other markings, indicating that the dedicated access module 200 is the preferred place to open and-or close the conveyor belt 100. The dedicated access portions 201, 202 can also be different in color from each other.

A first access portion 201 comprises a body 204 forming a top conveying surface 210 aligned with the top conveying surfaces 110 of the standard modules 101, an opposite bottom surface and extending in width from a first side to a second side and in length from a first, outer end to a second, inner end. The first, outer end includes a plurality of hinge elements 220 for connecting to a standard conveyor belt module 101 via hinge elements 120 in an articulatable manner. A second, inner end includes a distinct connection means 221 for connecting with a corresponding connection means on a second access portion 202 in a non-articulatable manner.

The second access portion 202 comprises a body 205 forming a top conveying surface 211 aligned with the top conveying surfaces 110, 210, an opposite bottom surface and extending in width from a first side, aligned with the first side of the body 204, to a second side, aligned with the second side of the body 204 and extending from a first, outer end to a second, inner end in length.

The second access portion 202 further includes a first, inner end forming the corresponding connection means 222 and a second, outer end having a plurality of hinge elements 220 for connecting to a standard module 101 in an articulatable manner via hinge elements 120.

The illustrative connection means 221, 222 comprise offset spaced-apart linking protrusions having a substantially rectangular cross-sectional shape with substantially rectangular openings 224 that align to form a connecting passageway when interleaved with each other. The linking protrusions 221, 222 have a top surface forming a top conveying surface 214 aligned with the top conveying surfaces 210, 211 of the bodies 204, 205 and the standard modules 110 and a bottom surface that is shaped to form a drive element 212, 213, shown as drive tooth, in the middle of the combined dedicated access module so that when interleaved, the linking protrusions 221, 222 form a laterally-extending drive bar, as shown in FIG. 3.

Figure 3:
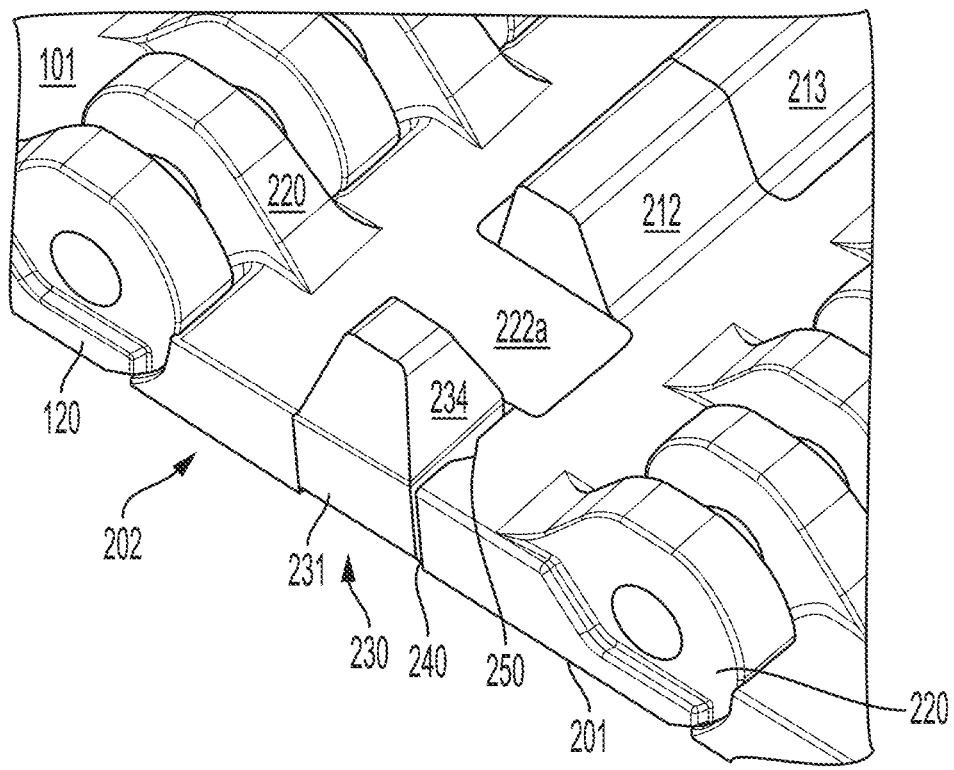
FIG. 3 is a detailed view of the bottom side edge of the dedicated access module of FIG. 1.

The linking protrusions 221, 222 on the first side of the bodies 204, 205 are both inset from the side edge of the body to form a space 240 in the side edge when the protrusions are interleaved, as shown in FIG. 3. In addition, a protrusion 222a closest to the side edge and space 240 lacks a drive element 213 protrusion, and instead includes a flat bottom surface.

When the two access portions 201, 201 mate, as shown in FIG. 1, the length of the combined dedicated access module 200 equals the length of a standard module 101, with drive elements 212, 213 on a bottom surface at the same pitch P as the standard module 101.

An access shaft 230 connects the first access portion 201 to the second access portion 202. The illustrative access shaft 230 has a substantially rectangular cross-section and fits in the passageway 224 formed by the rectangular protrusions 221, 222. The access shaft 230 prevents articulation of the body 204, 204 to form a fixed module.

The illustrative access shaft 230 incudes a head 231 that fits into the space 240 between the first and second access portions. The illustrative head 231 has a cuboid shape, but can have any suitable shape for fitting in the space 240, which may also have any suitable complementary shape. The illustrative shaft portion 232 extending from the head 231 has a rectangular cross-section to prevent articulation, but can have any other suitable shape. The illustrative shaft portion has a tapered end, but the invention is not so limited. A shaped protrusion 234, shaped like a truncated pyramid in the illustrative embodiment, extends down from the head, mimicking the drive elements 212.

As shown in FIG. 3, when the dedicated access module 200 is fully assembled, the access shaft protrusion 234 is spaced from the drive element 212 to form a gap at the bottom of the end connection element 222a, allowing a user to grasp the access shaft and pull the access shaft out to easily disassemble the dedicated access module 200.

Figure 4:
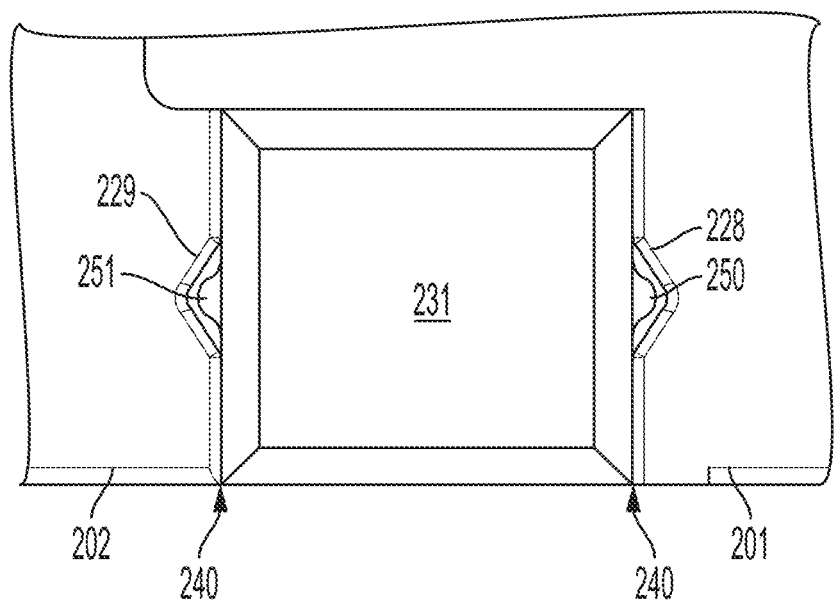
FIG. 4 is a top view of the side edge of the dedicated access module showing the connecting shaft.

As shown in FIGS. 3 and 4, the shaft head 232 further includes snap-tabs 250, 251 for securing the access shaft 230 to the dedicated access module 200 by interference fit. The snap-tabs 250 are received in vertical recesses 228, 229 in the body portions 201, 201 facing the space 240. Other means for securing the access shaft in a locking position may be used.

The access shaft 230 may have a different color than the standard modules 101 and-or the dedicated access module 200 and-or may include other indicia directing a user to open and-or close a conveyor belt employing the dedicated access module 200 at that location.

Figure 5:
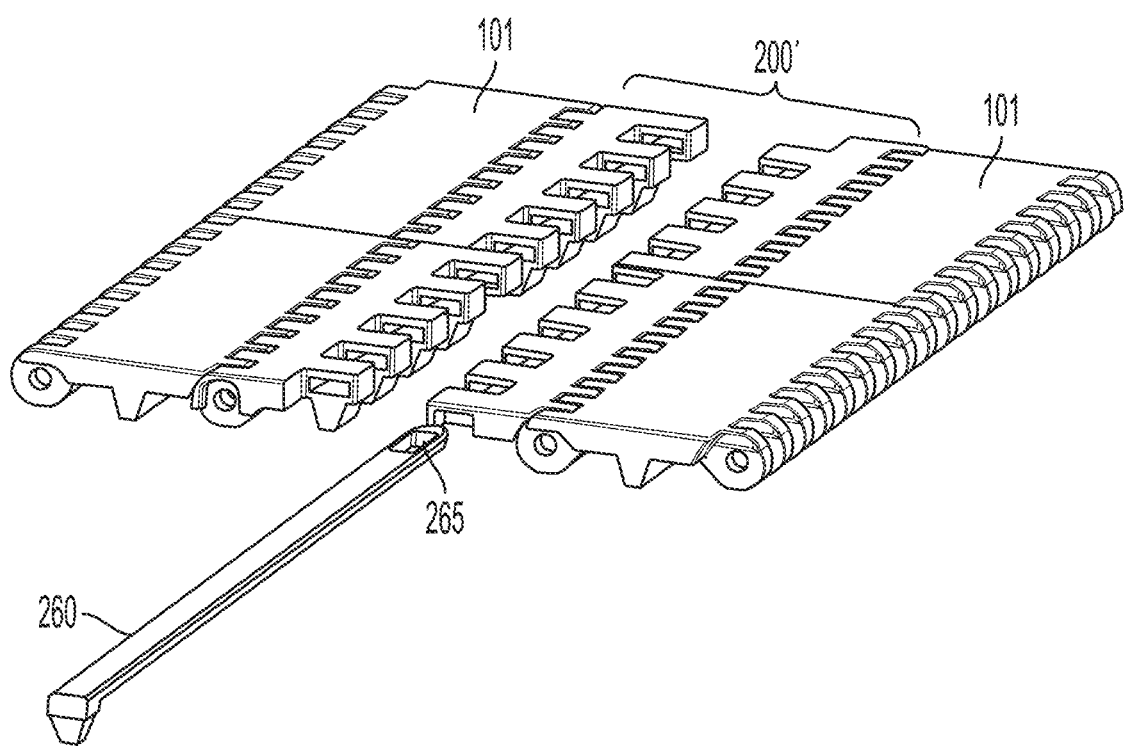
FIG. 5 is an isometric view of a dedicated access module according to another embodiment.
Figure 6:
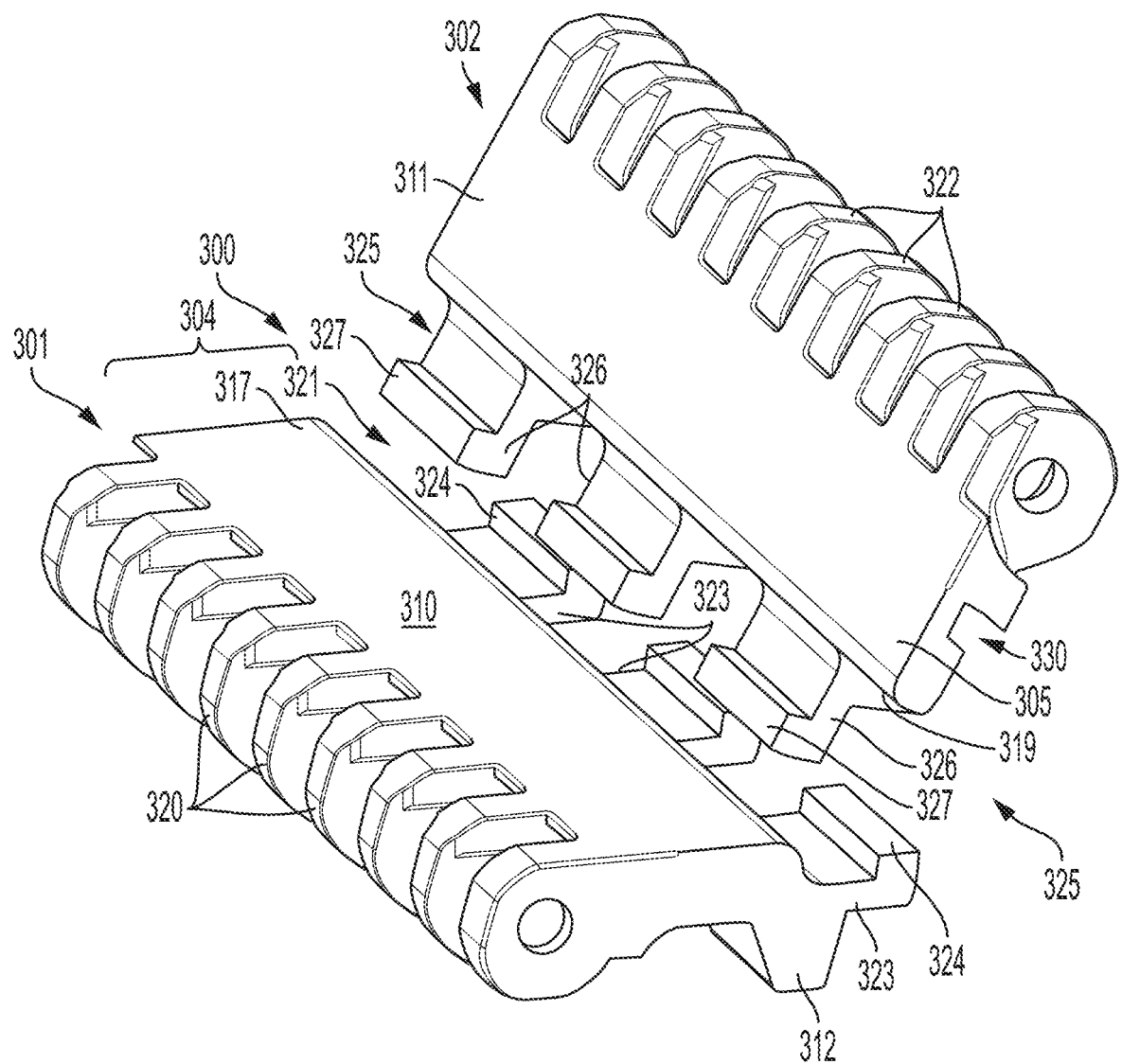
FIG. 6 is an isometric view of an open dedicated access module including two snap-together mating portions.

Referring to FIG. 5, in another embodiment, an access shaft 260 for a dedicated access module 200' can include another latching means, such as an opening 265 in an end or other location along the length of the shaft portion that engages with a feature in the connecting passageway of the dedicated access module 200' to secure the access shaft 260 to the dedicated access module 200'.

As shown in FIGS. 6-12, a dedicated access module 300 for a modular conveyor belt may comprise first and second portions 301, 302 that snap together to form a complete dedicated access module 300 that can be easily coupled and uncoupled without external tools to close and open a modular conveyor belt employing the dedicated access module 300. A first portion 301 includes standard, articulating hinge elements 320 at a first, outer end, a body 304 forming top conveying surface 310 with an opposite bottom surface, a rounded inner end edge 317 and a non-articulating connector 321 at second, inner end. The standard, articulating hinge elements 320 may be configured to connect to a standard conveyor belt module, such as standard module 101. The non-articulating connector 321 comprises a series of spaced apart protrusions 323, each protrusion including a tip 324 extending upwards. The illustrative protrusions 323 are cuboid in shape, and stepped down from the top conveying surface 310.

The second portion 302 includes standard, articulating hinge elements 322 at a first, outer end, a body 305 forming a top conveying surface 311 extending to an opposite bottom surface, a rounded inner end edge 319 and a non-articulating connector 325 at a second, inner end. The non-articulating connector 325 comprises a series of spaced apart protrusions 326 offset from the protrusions 323, each protrusion also including a tip 327, and similar to the protrusions 323. The bottom surfaces of each portion 301, 302 include recesses 330, 331 complementary to the tips and configured to receive the corresponding tips 324, 327 when the dedicated access module 300 is assembled.

Figure 8:
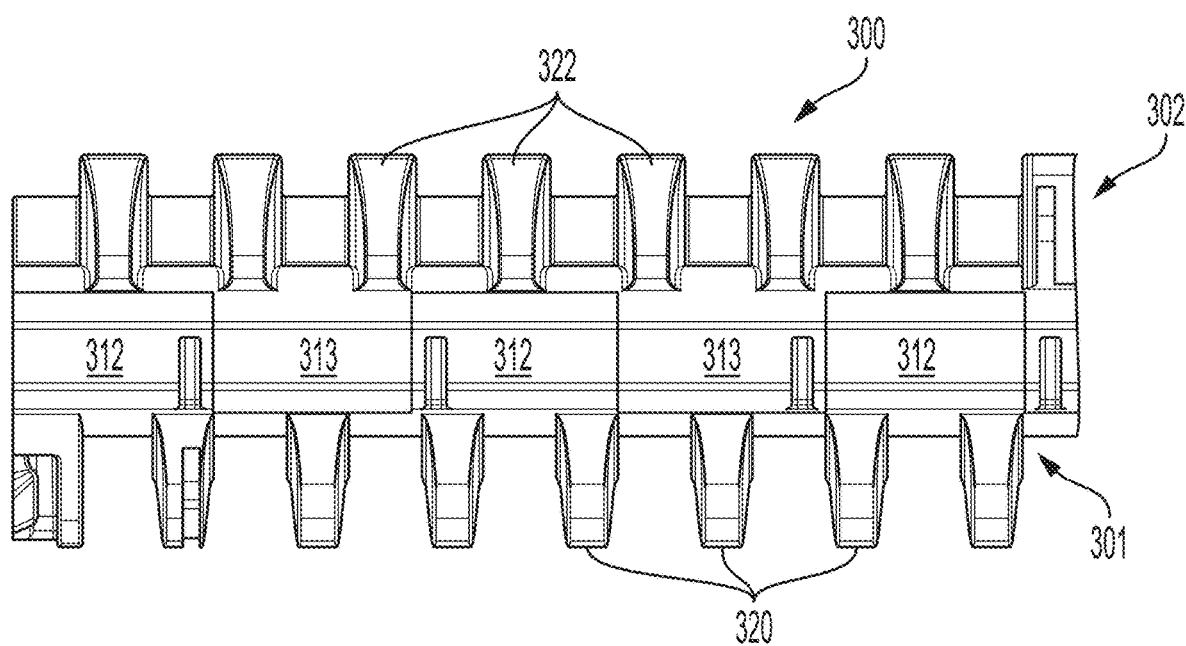
FIG. 8 is a bottom view of the assembled dedicated access module of FIG. 6.

The protrusions 323, 326 form drive tooth structure on the bottom 312, 313. When assembled, the drive teeth 312, 313 interleave and align to form a lateral drive bar across the width of the dedicated access module 300, as shown in FIG. 8.

Figure 7:
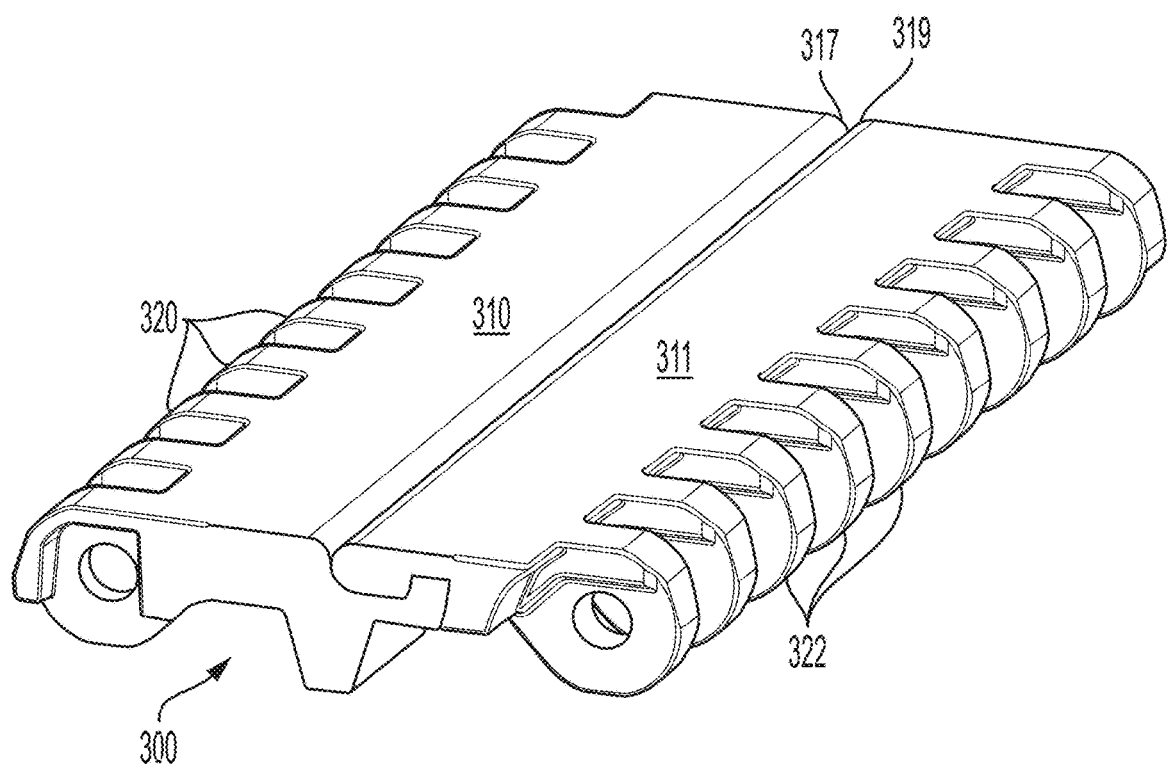
FIG. 7 is an isometric view of the dedicated access module of FIG. 6 in an assembled position.
Figure 9:
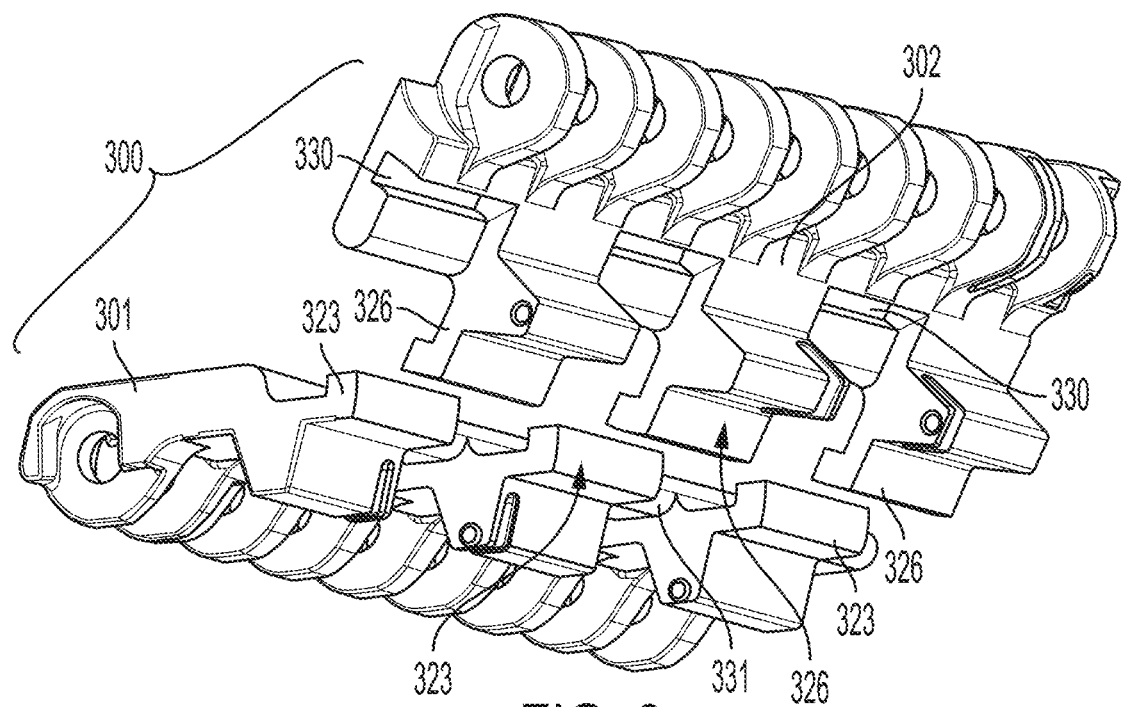
FIG. 9 is a bottom view of the dedicated access module of FIG. 6 during assembly.
Figure 10:
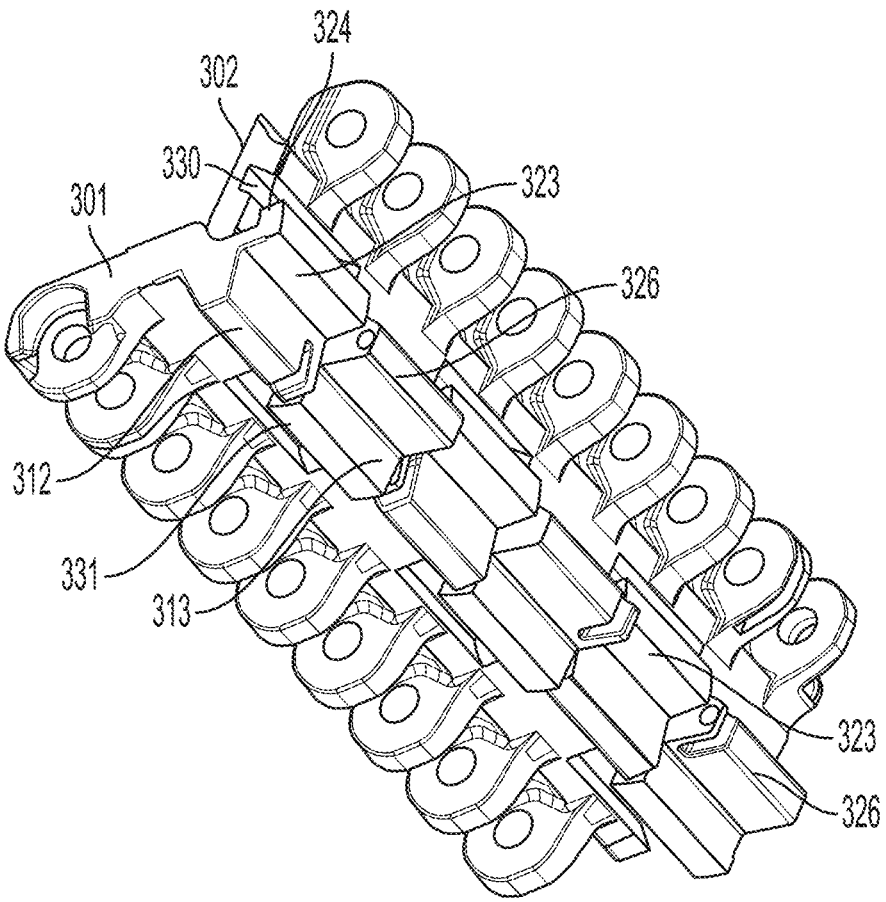
FIG. 10 is another bottom view of the dedicated access module of FIG. 6 during mating of the two snap-together mating portions.

To assemble the dedicated access module 300, the portions 301, 302 are placed at an angle relative to each other, as shown in FIGS. 9 and 10, with the protrusions 323 aligned with the spaces between the protrusions 326, and protrusions 327 aligned with spaces between protrusions 323. The tips 324 and 327 are inserted in the recesses 330, 331 and the portions 301, 302 rotated into engagement with each other, with the rounded front edges 318, 319 abutting each other, as shown in FIG. 7. During operation of a conveyor belt employing the dedicated access module 300, the tensile forces on the belt in addition to the locking connection between the components keep the dedicated access module locked.

Figure 11:
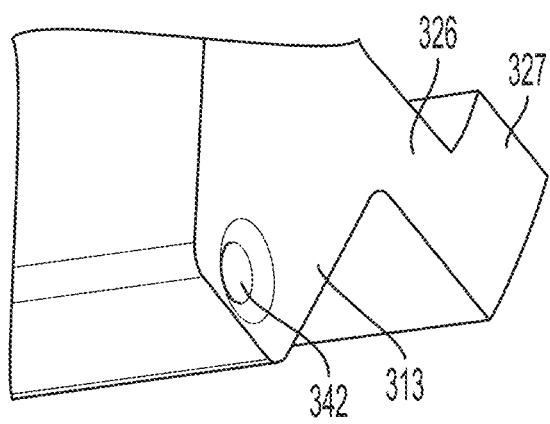
FIG. 11 is an isometric view of a drive tooth of a mating portion of the dedicated access module of FIG. 6.
Figure 12:
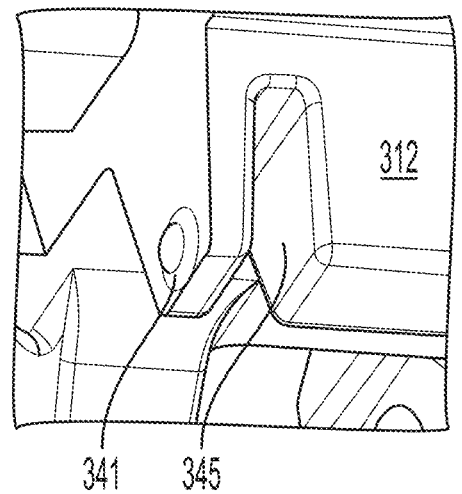
FIG. 12 is an isometric view of a drive tooth of another mating portion of the dedicated access conveyor belt module of FIG. 6.

As shown in FIGS. 11-12, the drive teeth 312 of the first portion may include side protrusions 341 configured to be received in side recesses 342 on the drive teeth 313 of the second portion 302 to facilitate assembly and retention of the two portions in an assembled mode.

In addition, as shown in FIG. 12, notches 345 in the drive teeth 312 flexing of the drive teeth during insertion and separation to facilitate mating and release of the protrusions 341 from the recesses 342.

To disassemble the dedicated access module 300, a user rotates the bodies 304, 305 relative to each other to pull the tips 324, 327 from the recesses 330, 331, and then pulls the bodies 304, 305 away from each other.

The dedicated access module 300 may have a different color or include suitable indicia indicating that the conveyor belt should be opened at that location.

The illustrative portions 301, 302 may be substantially identical in structure, simply rotated to allow engagement with each other.

Figure 13:
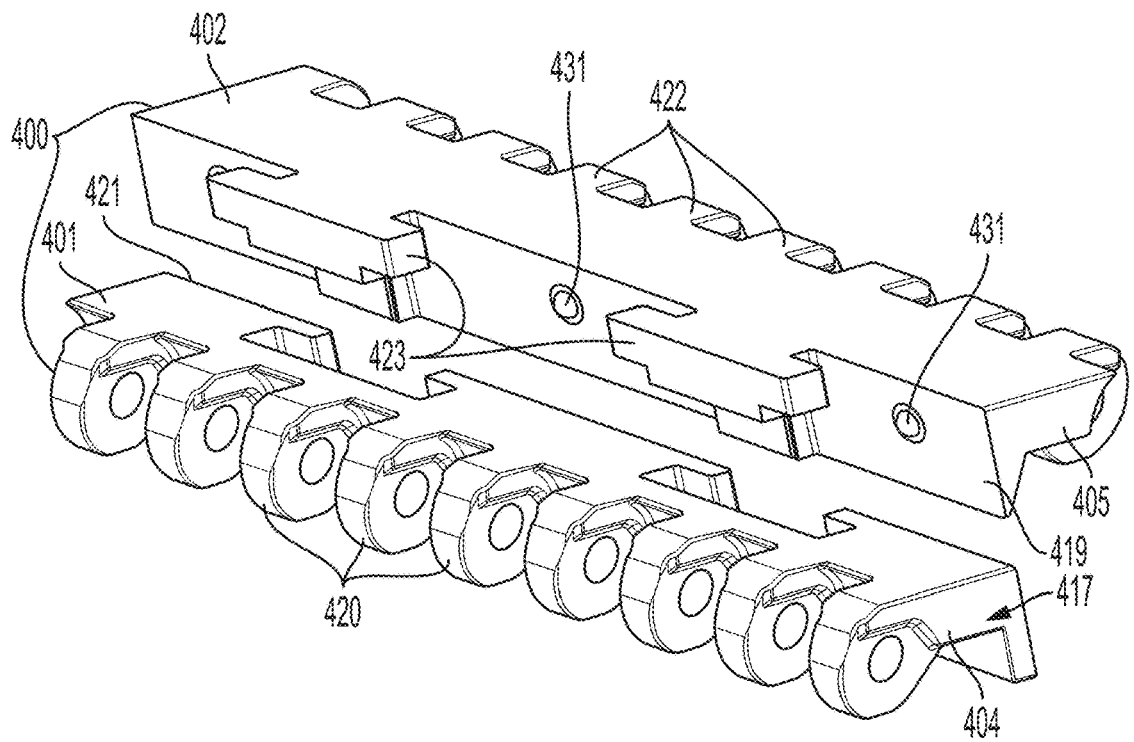
FIG. 13 is an isometric view of a dedicated access module including interlocking connecting elements on mating portions.
Figure 14:
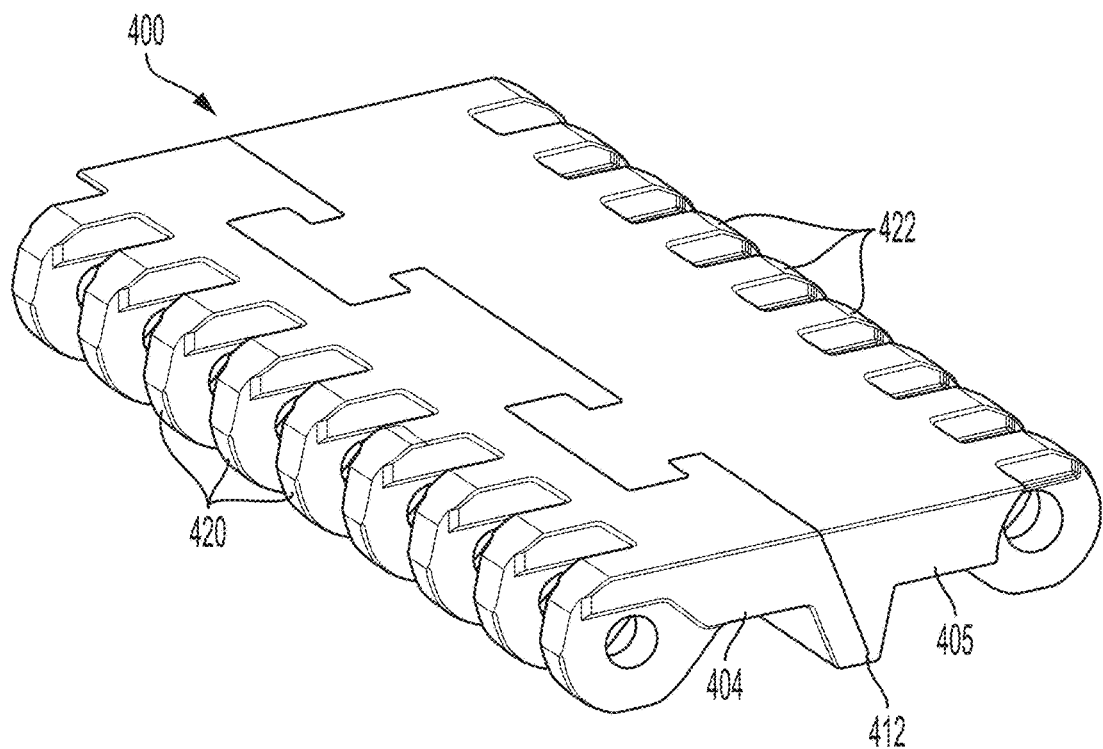
FIG. 14 is an isometric view of the dedicated access module of FIG. 13.
Figure 15:
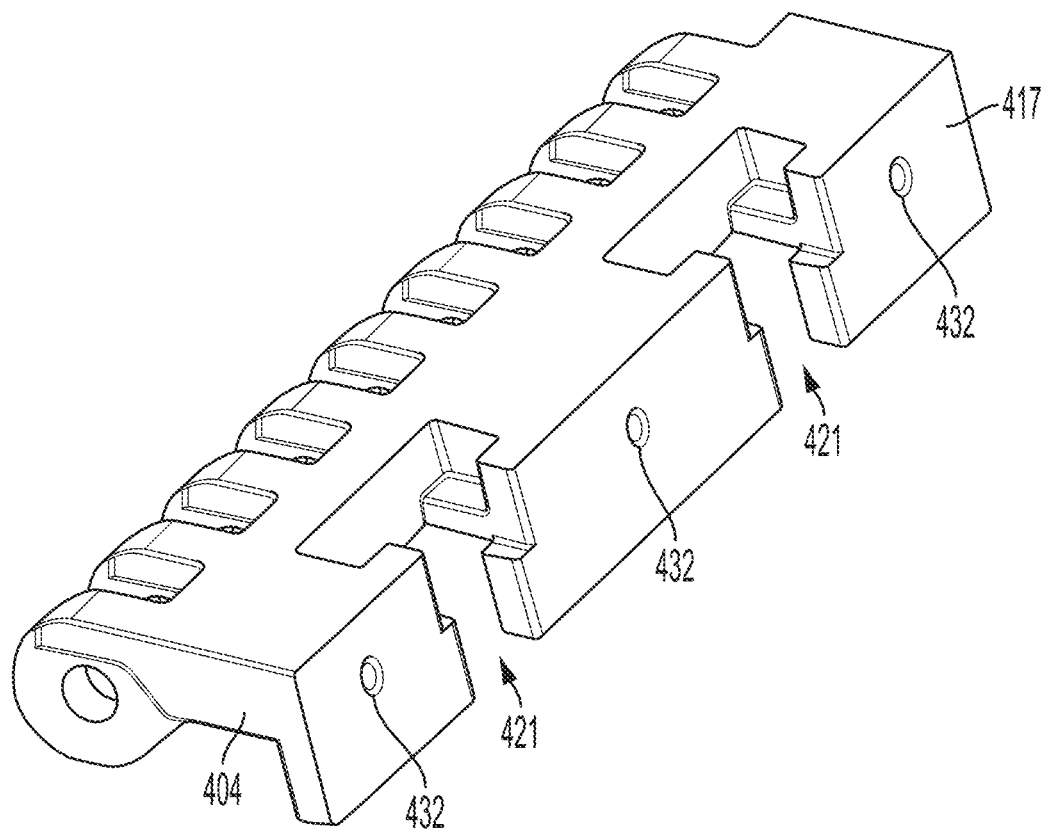
FIG. 15 is an isometric view of a first mating portion of the dedicated access module of FIG. 13.
Figure 16:
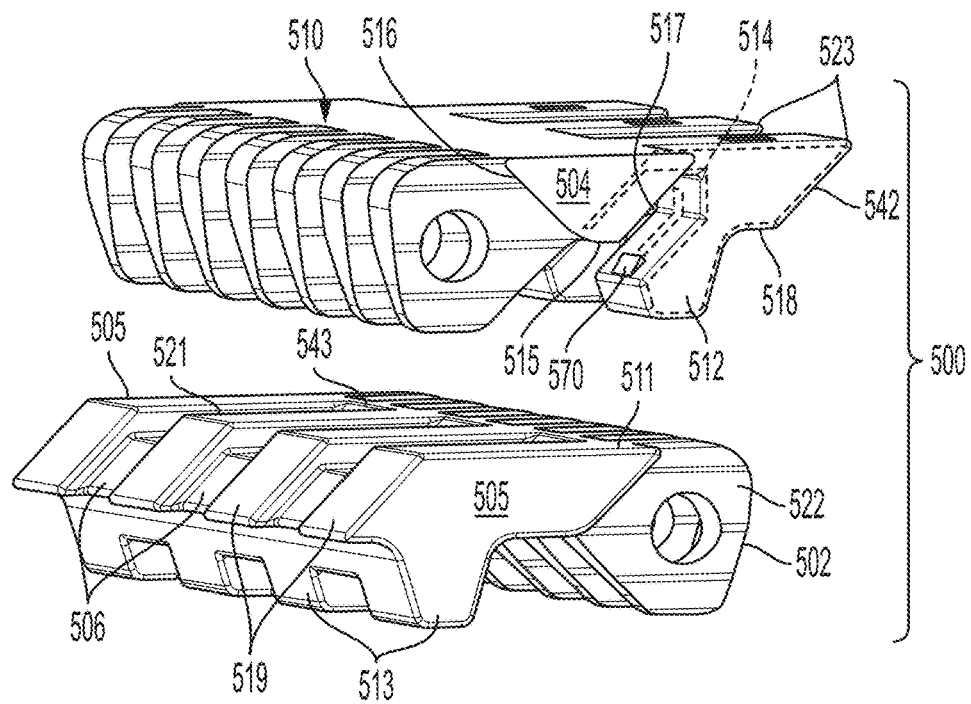
FIG. 16 is an exploded view of a dedicated access module including slide-together mating portions according to another embodiment.
Figure 17:
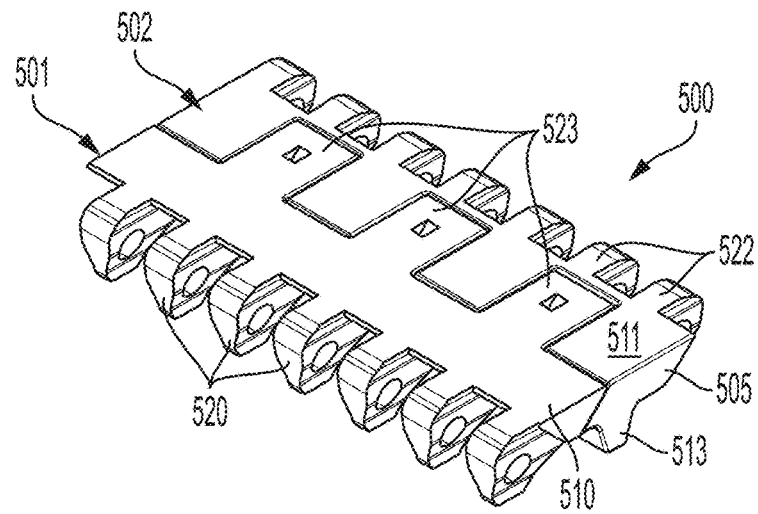
FIG. 17 is an isometric view of the dedicated access module of FIG. 16 in an assembled position.
Figure 18:
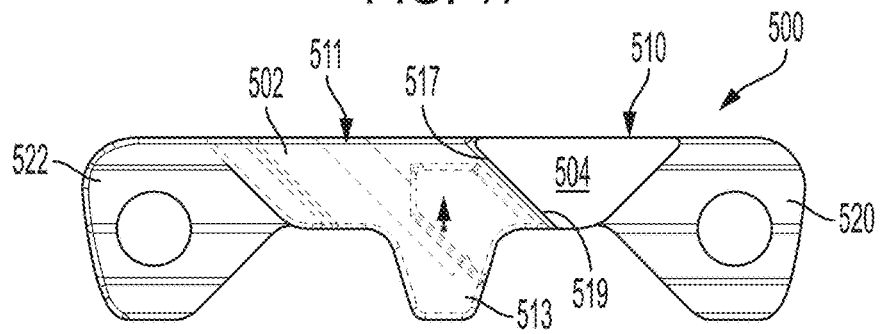
FIG. 18 is a cross-sectional view of the dedicated access module of FIG. 16.
Figure 19:
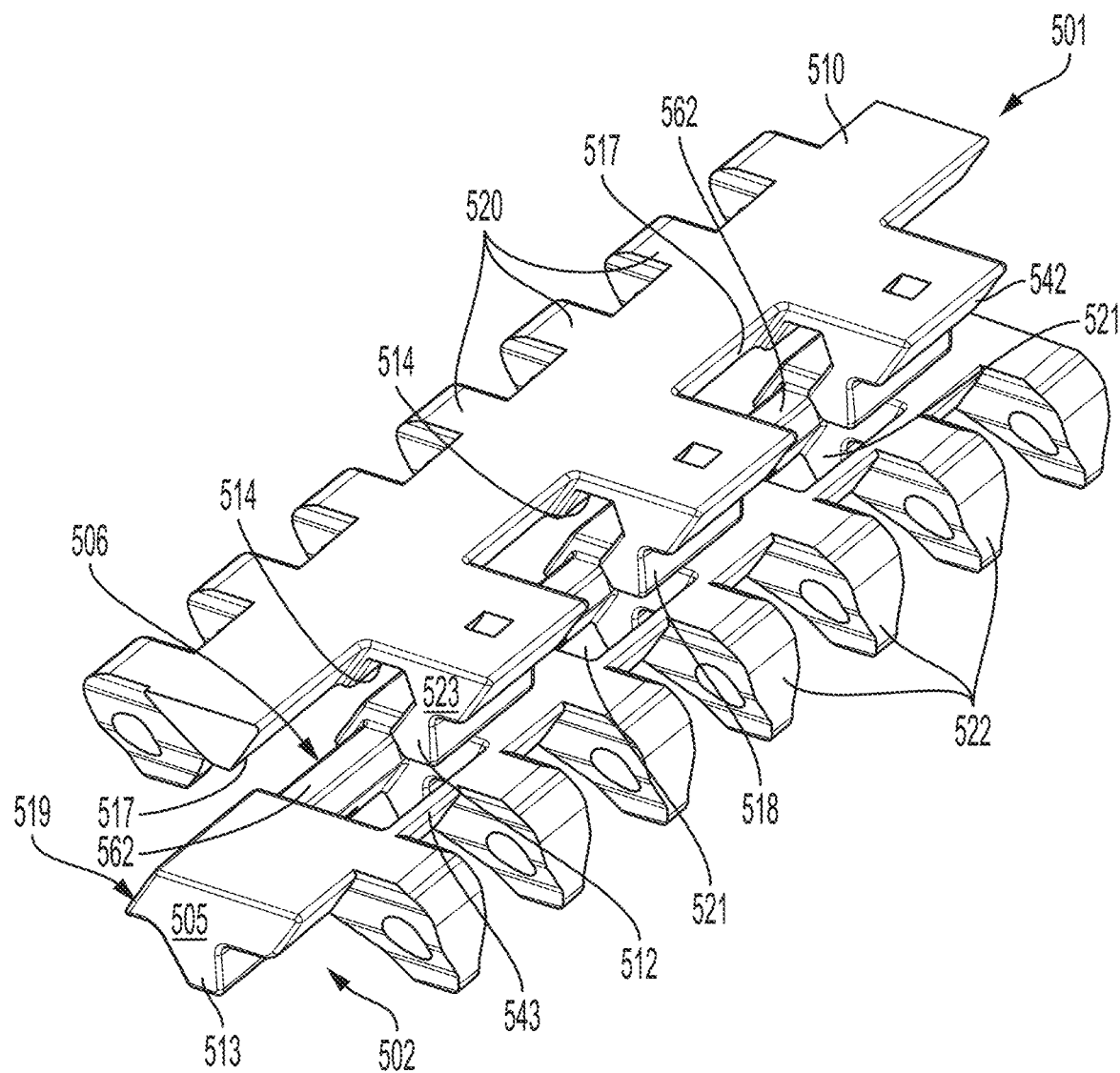
FIG. 19 is an isometric top view of the conveyor belt module of FIG. 16 during assembly.
Figure 20:
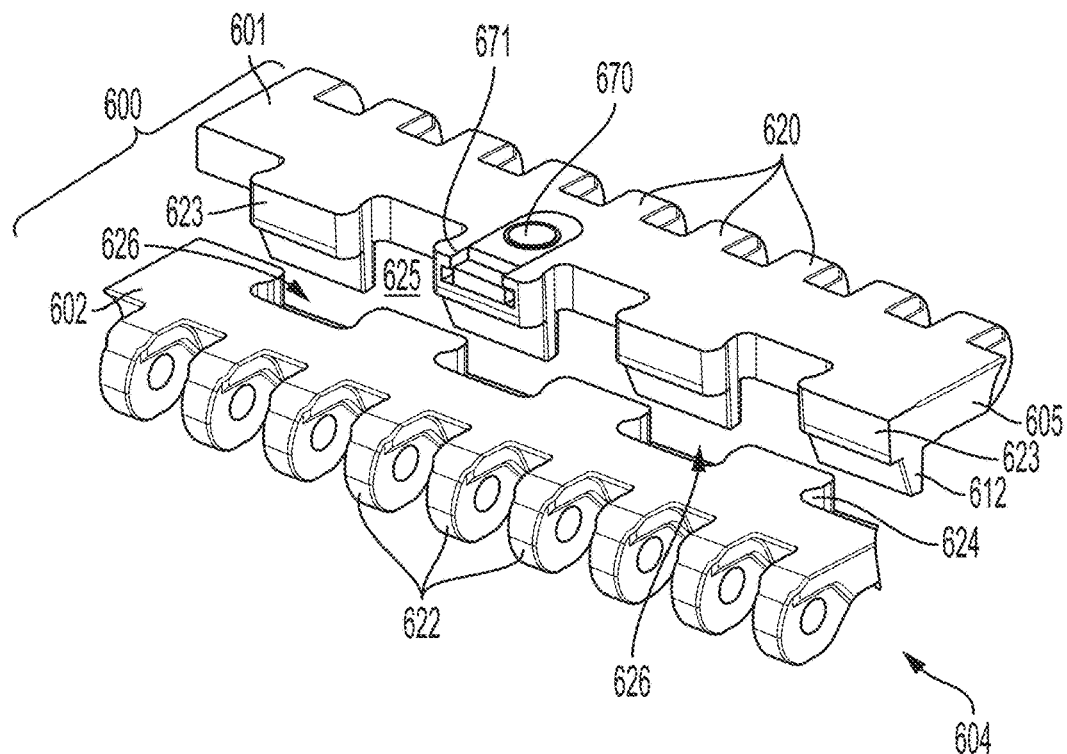
FIG. 20 is an exploded view of a dedicated access module including two mating portions and a sliding lock according to another embodiment.
Figure 21:
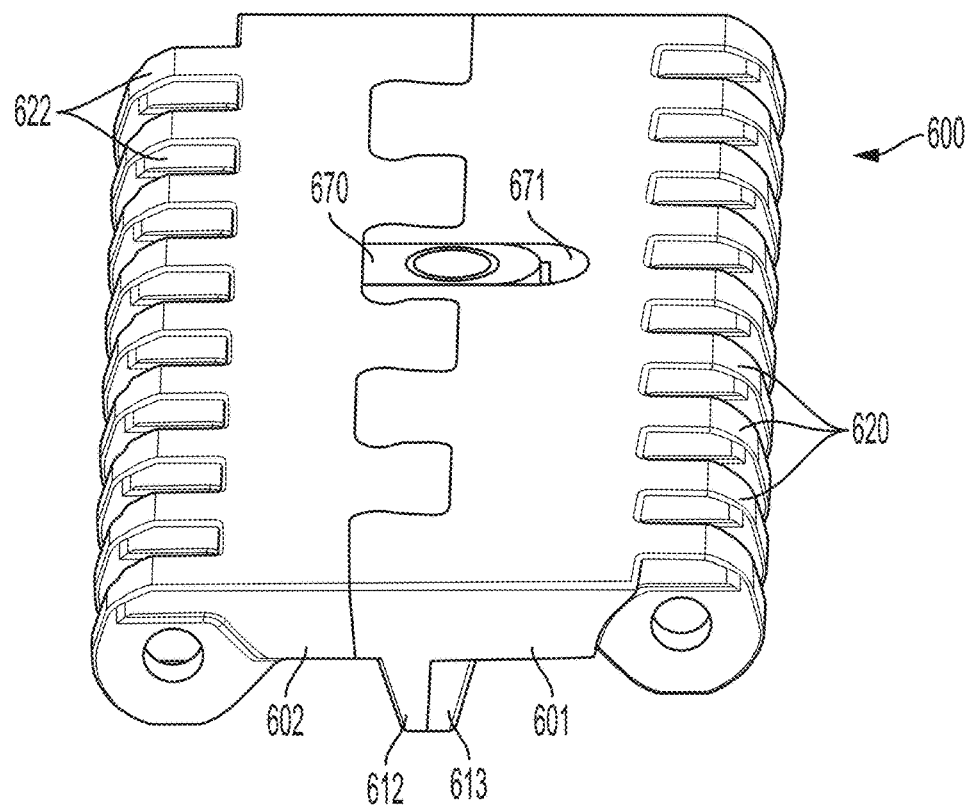
FIG. 21 is an isometric view of the dedicated access module of FIG. 20 when assembled.

Referring to FIGS. 13-15, a dedicated access module 400 may comprise first and second mating portions 401, 402 that snap together by vertically aligning complementary connecting elements and moving the portions 401, 402 into mating connection. A first mating portion 401 incudes a body portion 404, standard, articulating hinge elements 420 at an outer end for connecting to a standard conveyor belt module, such as standard module 101, and a non-articulating connector 421 at an inner end comprising recesses designed to receive protrusions on the second portion 402.

The second mating portion 402 comprises a body portion 405, standard, articulating hinge elements 422 for connecting to a standard conveyor belt module, such as standard module 101, and a non-articulating connector 423 at a second, inner end configured to engage the connector 412.

The illustrative first portion non-articulating connector 421 comprises T-shaped recesses formed in the inner end 417 of the body 404. The illustrative second portion non-articulating connector 423 comprises T-shaped protrusions extending from the inner end 419 of the body 405. The inner end walls 417, 419 extend from a top conveying surface to a bottom edge, which defines a drive tooth 412 when the mating portions 401, 402 connect to form the dedicated access module 400. The inner walls 417, 419 may be angled in a complementary manner.

Each illustrative connector protrusion 423 includes a rectangular base extending from the inner end wall 419 and extending from the top surface to the bottom edge. The base widens at the top half and extends farther inwards. A top bar extends laterally at the top, inner end of the protrusion 423. A recess 421 of the first mating portion 401 is configured to receive a corresponding connecting protrusion 423. Each illustrative recess 421 includes a widening opening in the inner wall 417 and a seat for the lateral bar, seating the protrusion 423 so that the top surfaces of the protrusion 423 are flush with the top surface of the mating portion body 404, thus forming a top conveying surface that aligns with top conveying surfaces of standard modules 101 that mate with the dedicated access module 400.

The illustrative dedicated access module 400 includes a lock for preventing the portions 401, 402 from sliding apart. In one embodiment, the lock comprises spring-loaded balls 431 in the inner wall 419 that are received in pockets 432 in the inner wall 417.

In another embodiment, the walls 417, 419 may be shaped to prevent disengagement. For example, the wall 419 may form a hook shape at the end to prevent disengagement.

The dedicated access module 400 may have a different color or include suitable indicia indicating that a conveyor belt including the dedicated access module 400 should be opened at that location.

Referring to FIGS. 16-19, another embodiment of a dedicated access module 500 comprises a first mating portion 501, and second mating portion 502 that engages with the first portion to form a dedicated access module 500 having standard hinge elements capable of mating in an articulatable fashion with a standard conveyor belt module, such as module 101, at both ends.

The first mating portion 501 comprises a body 504 forming a top conveying surface 510, an opposite bottom surface 515 and having standard, articulating hinge elements 520 extending from a first, outer end. Spaced-apart, non-articulating connection protrusions 523 extend from the inner end 517 of the body 504. The illustrative wall of the inner end 517 is angled, as is the outer end wall 516 of the body 504, from which the hinge elements 520 extend, so that the body 504 tapers in length from the top conveying surface 510 to the bottom surface 514.

The connection protrusions 523 have top surfaces flush with the top surfaces 510 and an angled end wall 542 that is parallel to the end wall 517. A shaped drive tooth section 512 extends down from each protrusion 523, each drive tooth section 512 having a slanted back wall 551 parallel to the walls 517 and 542. A bottom surface 518 of the protrusions 523 between the angled end wall 542 and the drive tooth section 512 may be co-planar with the bottom wall 515 of the body 504. A bottom surface 514 at the outer end of the protrusions 523, between the drive tooth section 512 and the inner end wall 517 of the body 504 is higher than the surfaces 515, 518, creating a thinner section in the connection protrusions 523.

The second mating portion 502 includes standard, articulatable hinge elements 522 at a first, outer end and a top surface 511 that is flush with the top surface 510 when the dedicated access module 500 is assembled. The second portion 502 includes openings 521 (best shown in FIG. 19) between solid sections 505 that are configured to receive the connection protrusions 523 of the first portion 501. The openings 521 each includes an angled outer wall 543 that is parallel with and configured to abut the angled end wall 542 of the connection protrusions 523 when the dedicated access module 500 is assembled. An angled inner wall 519 is parallel with and configured to engage the end wall 517 of the first portion 501. Drive elements 513 extend from the bottom surface of the solid sections 505 of the second portion 502 and interleave with the drive tooth sections 512 of the first portion 501 when the dedicated access module 500 is assembled.

Solid bridging portions 506 define the inner ends of the openings 521 and connect the solid sections 505 at the inner end of the portion 502. The bridging portions 506 have a top surface 562 that abuts surface 514 of the first mating portion 501 when the dedicated access module 500 is assembled. The bottom surface of the bridging portions 506 extends between drive elements 513 and cooperate with the drive tooth sections 512 to form a complete, laterally-extending drive bar when the dedicated access module 500 is assembled.

When the mating portions 501 and 502 mate, the tensile forces in the belt ensure the portions remain engaged. Squeezing the portions 501, 502 together can cause the portions 501, 502 to disengage, allowing a user to open a conveyor belt employing the dedicated access module 500 at that location. A user can also reconnect the dedicated access module 500 by inserting the drive tooth sections 512 in the openings 521 and pulling the mating portions 501, 502 into engagement.

In one embodiment, the dedicated access module 500 further includes a lock for locking the portions 501, 502 together. The illustrative dedicated access module includes a mechanical snap lock, comprising detents 570 on inner surfaces of the drive tooth portions 512 that snap into place when the conveyor belt is assembled. A tool may be used to unlock the detents.

Referring to FIGS. 20-24, a dedicated access module 600 comprises mating first and second portions 601, 602 and a sliding lock 670 for locking the two mating portions 601, 602 together to form a complete module. A first mating portion 601, in which the sliding lock 670 is enclosed, comprises a body 605 having standard, articulating hinge elements 620 at a first, outer end and non-articulatable connecting elements 623 at a second, inner end. The non-articulatable connecting elements comprise shaped, spaced-apart protrusions configured to receive and interleave with shaped-spaced apart protrusions 624 on an inner end of a body 604 of the second mating portion 602. The illustrative protrusions 623, 624 and complementary recesses 625, 626 between the spaced-apart protrusions 623, 624 are lobe-shaped, but the invention is not so limited. The lobe shape prevents disengagement of the mating portions 601, 602 in the longitudinal direction.

Figure 22:
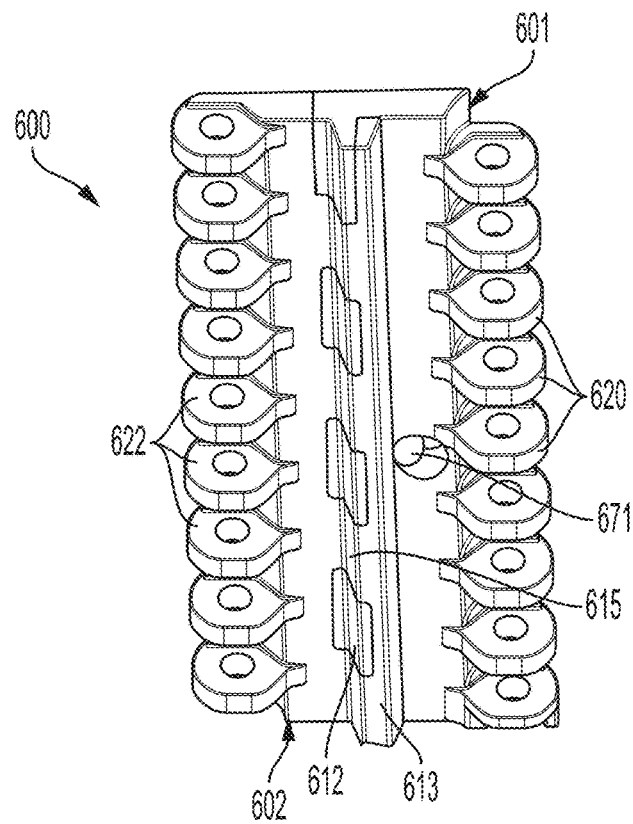
FIG. 22 is a bottom view of the dedicated access module of FIG. 21.

Each shaped protrusion 623 on the first mating portion 601 includes a downward-extending drive element portion 612 on a bottom surface. The second mating portion 602 includes a drive element 613 comprising a drive bar half extending laterally across the width of the mating portion 602. The drive bar half is connected to the body 605 by spaced-apart drive element portions 615. When the connecting elements 623, 624 mate, the drive element portions 612 extending through spaces formed between the drive element portions 615 and into engagement, so that the portions 612, 615 and drive bar halves 613 form a complete drive bar extending laterally across the width of the completed dedicated access module 600, as shown in FIG. 22.

Figure 23:
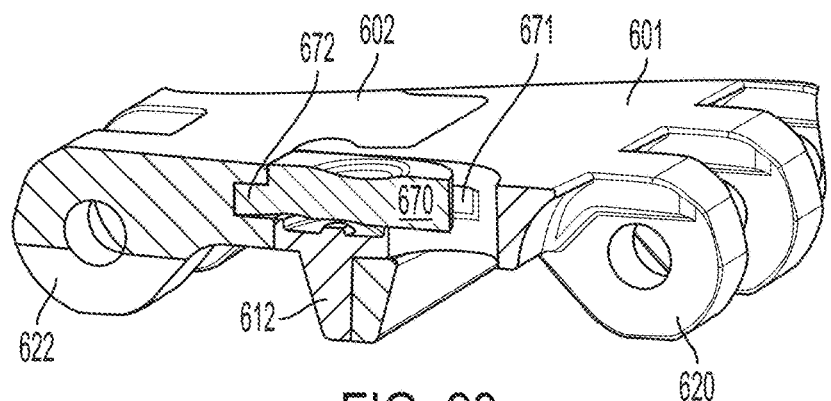
FIG. 23 is a cross-sectional side view of the dedicated access module of FIG. 21 when the sliding lock is engaged.
Figure 24:
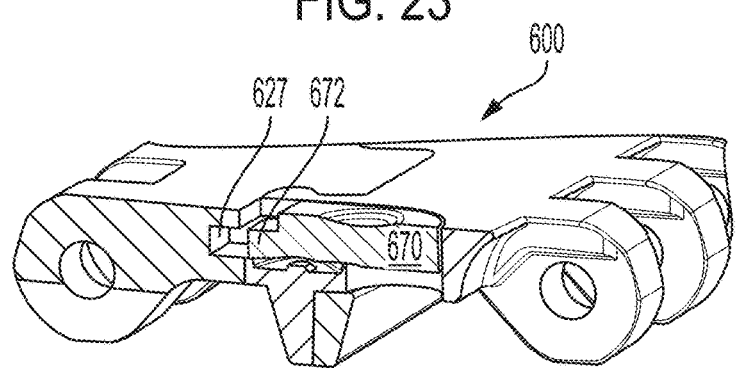
FIG. 24 is a cross-sectional side view of the dedicated access module of FIG. 21 when the sliding lock is disengaged.

One or more of the shaped connecting protrusions 623 includes a sliding locking mechanism 670 disposed in a recess 671. The recess 671 is longer than the main body of the sliding locking mechanism 670 to allow the locking mechanism to slide in the recess 671. The sliding locking mechanism 670 includes an inner projection 672 configured to be received in a slot 627 in a corresponding space between connecting protrusions 624 on the second mating portion 602, as shown in FIGS. 23 and 24.

To form the dedicated access module 600, a user mates the two portions 601, 602 by interleaving shaped protrusions 623, 623, (aligning the protrusions and corresponding recessed vertically, and moving them into engagement) then sliding the locking mechanism 670 into engagement with the slot 627. A user can easily and toollessly disassemble the dedicated access module 600 by sliding the locking mechanism 670 out of engagement and pulling the portions 601, 602 apart.

Referring to FIGS. 25-29, another embodiment of a dedicated access module 700 comprises mating portions 701, 702 and a rotating insert 770 for securing the mating portions 701, 702 together and enabling disengagement of the mating portions 701, 701 without external tools.

The illustrative first mating portion 701 comprises a body 704 having articulatable standard hinge elements 720 on an outer end and extending to an inner end 717. A drive bar 712 extends laterally across the bottom surface of the body 704.

In the upper surface, the body 704 includes a recess 730 for receiving the second mating portion 702, which includes articulatable standard hinge elements 722 on an outer end, and the rotating insert 770 to form a complete module for a conveyor belt. The recess 730 includes an outer latching protrusion 731 extending up from the bottom wall of the recess 730 and an inner latching protrusion 732 extending longitudinally outward from the inner end 717. The body 704 further includes channels 735 for receiving the rotating insert 770.

The rotating insert 770 comprises annular pivot elements 771 that interleave with the hinge elements 720, bridges 772 that fit into channels 735 and a locking base 774. The illustrative locking base 774 has a flat top surface that is flush with the top surface of portions 701, 702 when the dedicated access module 700 is assembled. The locking base 774 has an angled outer wall 775 that abuts an angled wall of the recess in the first portion body 704 and a straight inner wall 776 that includes an upper locking protrusion 777 and a lower locking protrusion 778.

The second mating portion 702 includes a body configured to mate with the first mating portion 701, the body having a top surface 706 and articulatable, standard hinge elements 722 extending from an outer end of the body. The second mating portion body is configured to fit in the recess 730 between sides walls of first mating portion body 704. The inner edge 709 of the second mating portion 702 includes a top recess 707 for engaging the locking protrusion 777 of the rotating insert and a bottom indent 708 for engaging the lower locking protrusion 778.

The bottom of the second mating portion 702 further includes longitudinally outward-extending latching protrusions 733, 734 configured to engage latching protrusions 731, 732 on the first mating portion 701.

Figure 25:
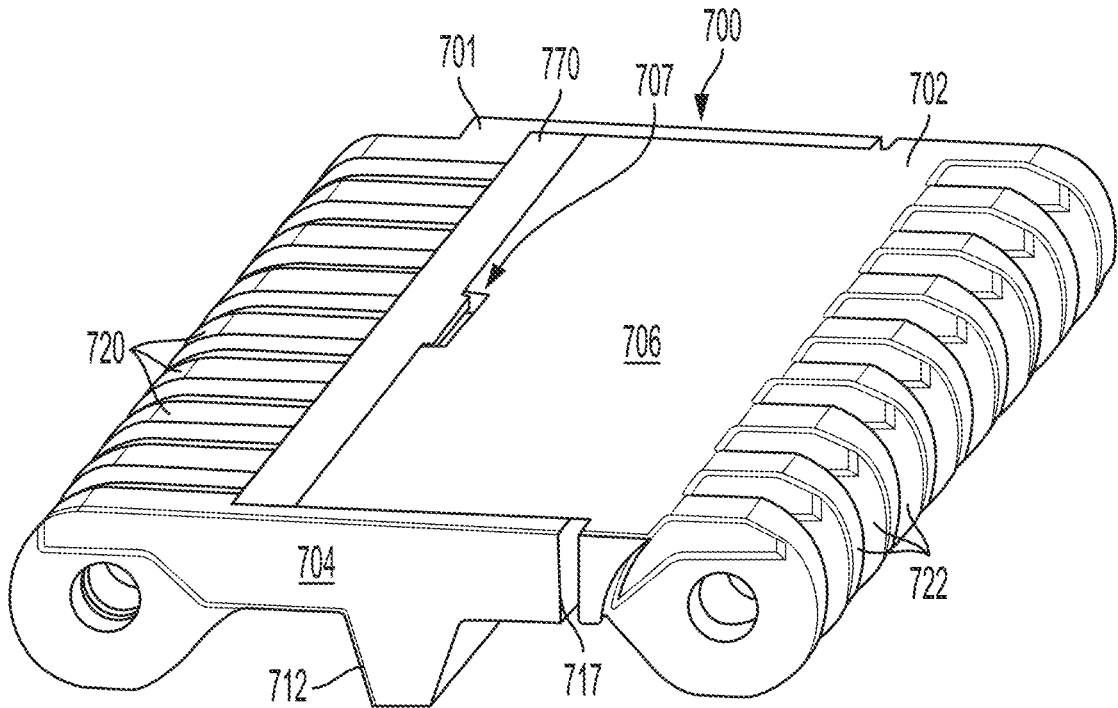
FIG. 25 is an isometric view of a dedicated access module including two mating portions and a rotating lock, according to another embodiment.
Figure 26:
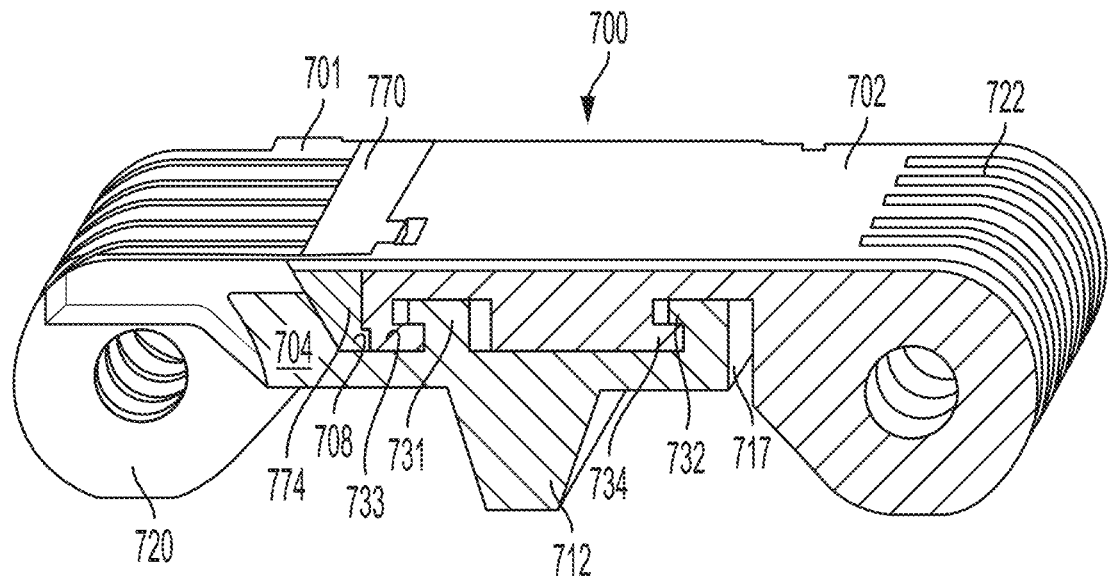
FIG. 26 is a cross-sectional side view of the dedicated access module of FIG. 25.
Figure 27:
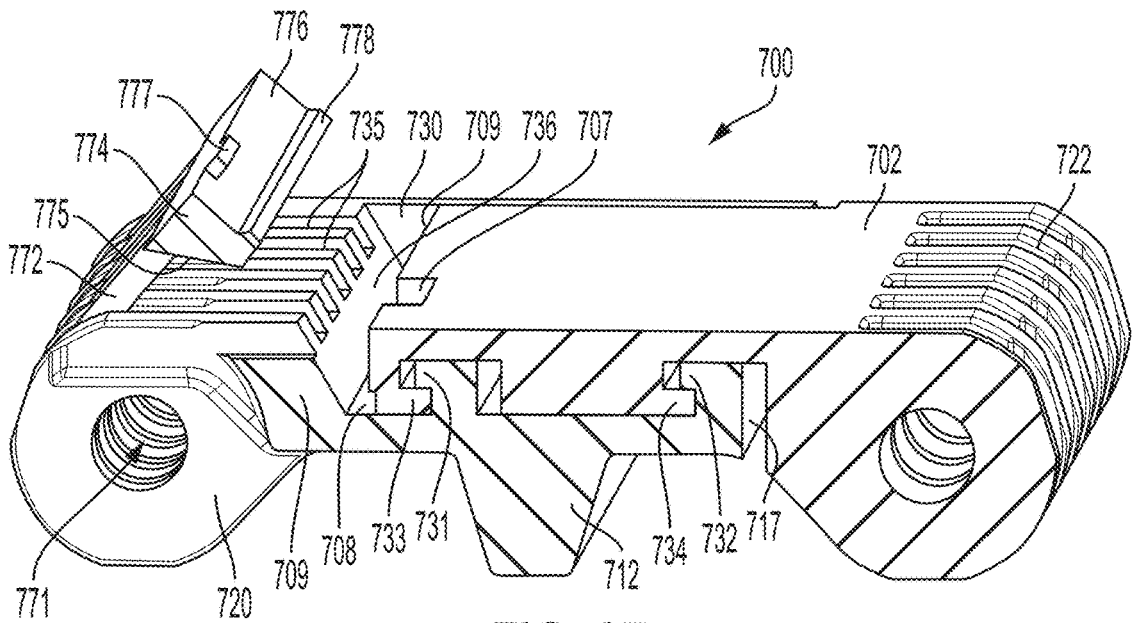
FIG. 27 is a cross-sectional side view of the dedicated access module of FIG. 25 when the rotating lock is disengaged.
Figure 28:
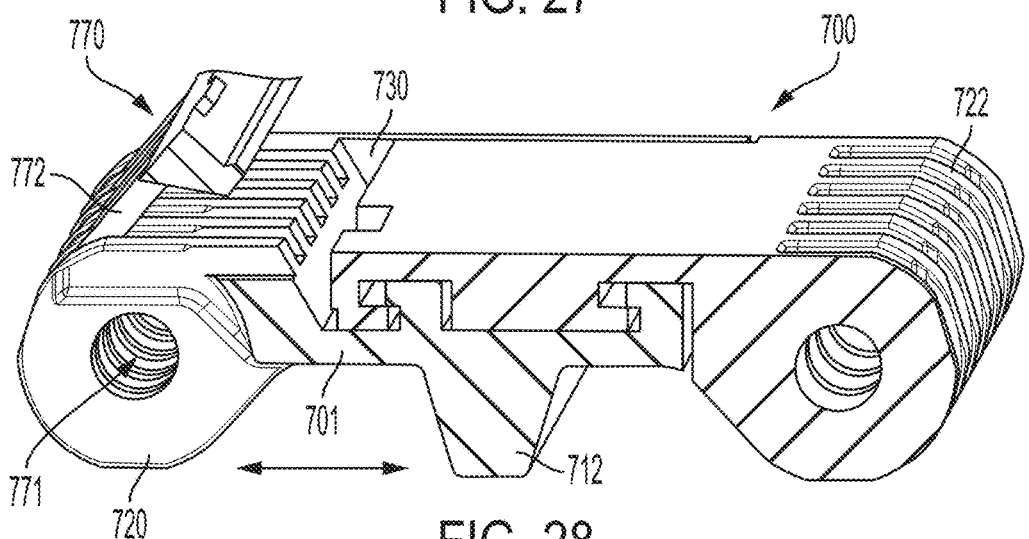
FIG. 28 is a cross-sectional side view of the dedicated access module of FIG. 25 during disengagement of the two mating portions.
Figure 29:
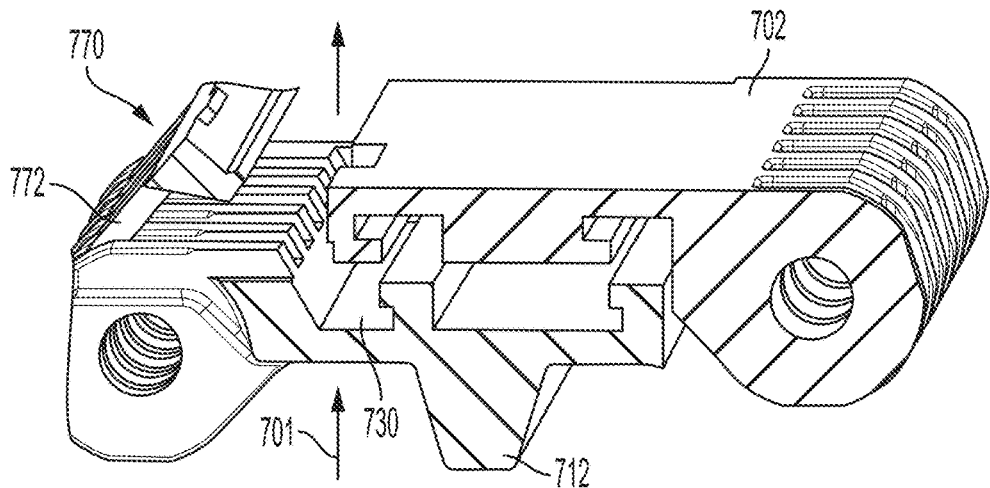
FIG. 29 is a cross-sectional side view of the separated mating portions of the dedicated access module of FIG. 25.
Figure 30:
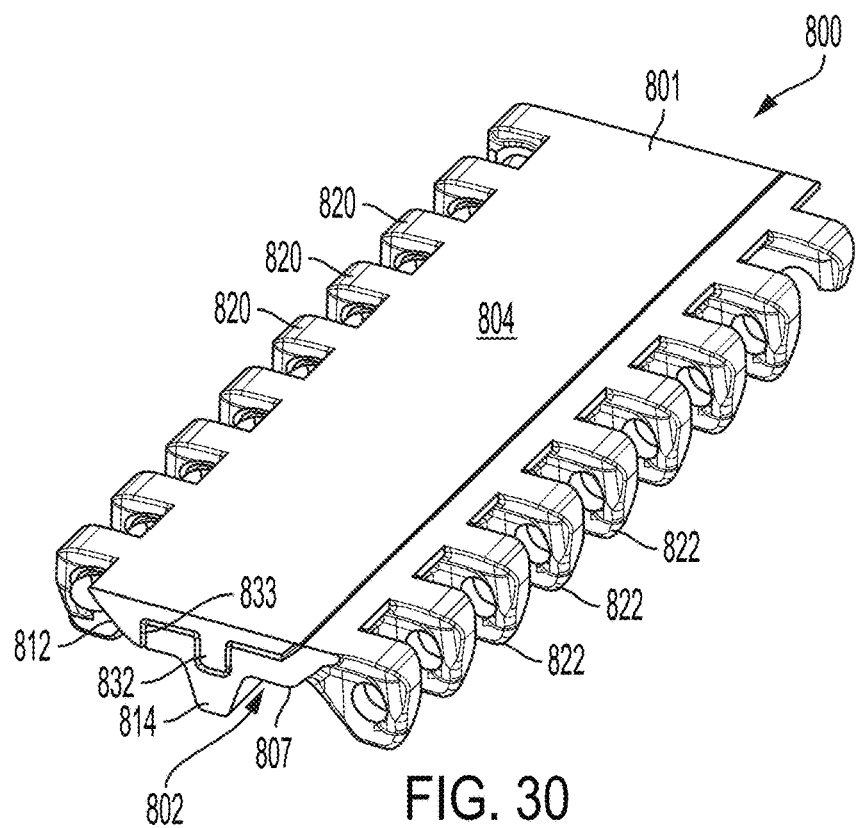
FIG. 30 is an isometric view of a dedicated access module employing overlapping, slidable mating portions.
Figure 31:
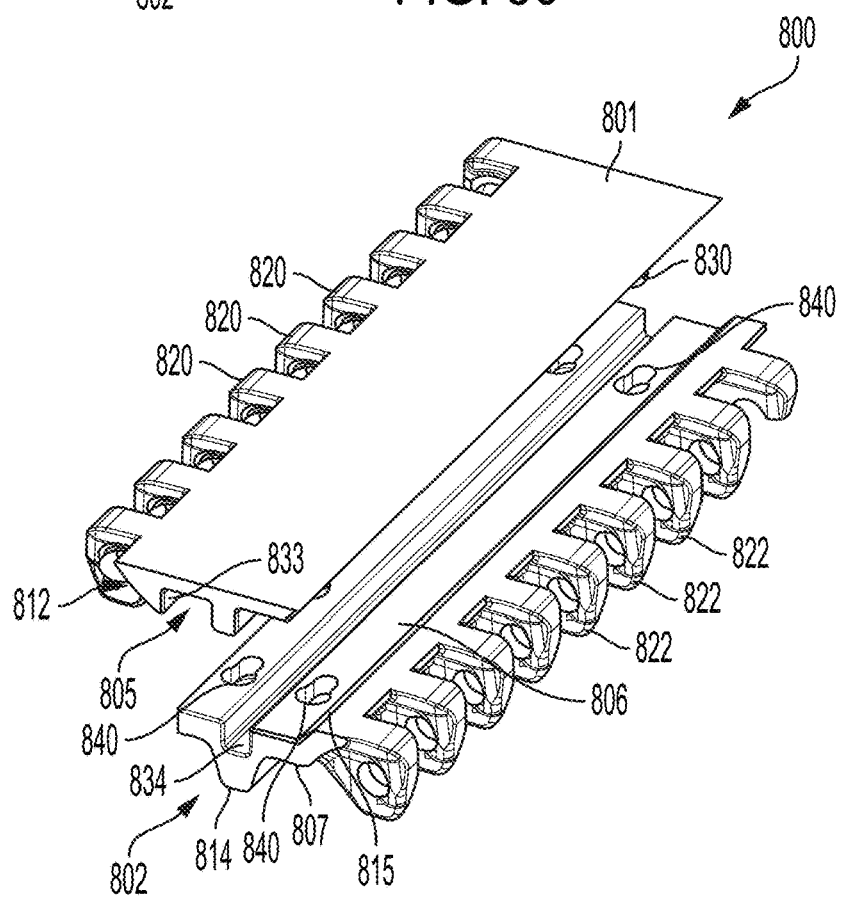
FIG. 31 is an isometric bottom view of the separated mating portions of the dedicated access module of FIG. 30.

In an operational position, shown in FIGS. 25 and 26, the rotating insert 770 pushes the locking protrusions 731, 732 into engagement with the locking protrusions 733, 734. To disengage the components and open the dedicated access module 700, a user pulls the locking base 774 of the rotating insert 770 out of engagement with the recess 707 and indent 708, rotating the locking base 774 about the pivot elements 771, held by a hinge rod inserted through the hinge elements 720, and away from the recess 730 in the first portion, as shown in FIG. 27. Then, a user pushes the portions 701 and 702 together until the latching protrusion 731, 732 clear the latching protrusions 733, 734, as shown in FIG. 28. The portions 701, 702 can then be separated by pulling the two mating portions 701, 702 apart vertically, as shown in FIG. 29. The dedicated access module 700 can be easily assembled in a reverse process.

Referring to FIGS. 30-38, another dedicated access module 800 comprises overlapping first and second mating portions 801, 802 secured by shaped protrusions 830 on a bottom surface of the overlying, first mating portion 801 that engage shaped openings 840 in the bottom, second mating portion 802.

A first mating portion 801 comprises a body having an upper surface 804 forming an upper conveying surface, articulatable, standard hinge elements 820 extending from an outer end of the body, formed by angled outer wall 812. The body extends to an angled inner wall 813 so that the body 804 tapers in length from the upper surface 804 to the opposite bottom surface 805. A reinforcing protrusion 832 extends laterally across the bottom surface 805 of the first mating portion body. A lip 833 protrudes down from the outer end of the bottom surface 805 for engaging an end of the second portion 802. Four shaped protrusions 830 extend down from the bottom surface 805, two on each side of the lateral reinforcing protrusion 832.

The second mating portion 802 comprises a body having an upper surface 806 forming a lateral channel 834 configured to slidably receive in the lateral reinforcing protrusion 832. The second mating portion body includes an angled outer wall 815 extending up and out from the upper surface 806, configured to interface with the angled inner wall 813 of the first mating portion 801. Articulatable, standard hinge elements 822 are stepped up from the second mating portion body and extend longitudinally from the top of the angled outer wall 815. A laterally-extending drive element 814 extends from the bottom wall 807 of the second mating portion body, and may include features to facilitate manipulation (sliding) of the second mating portion 802 relative to the first mating portion 801.

The mating of the reinforcing protrusion 832 and the corresponding lateral channel 834 transfers load between the two mating portions 801, 802.

Figure 32:
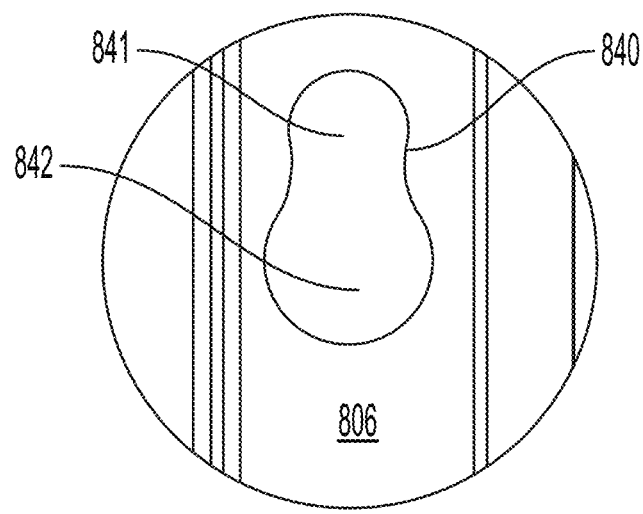
FIG. 32 is a detailed view of a shaped opening in the bottom mating portion of the dedicated access module of FIG. 30.
Figure 33:
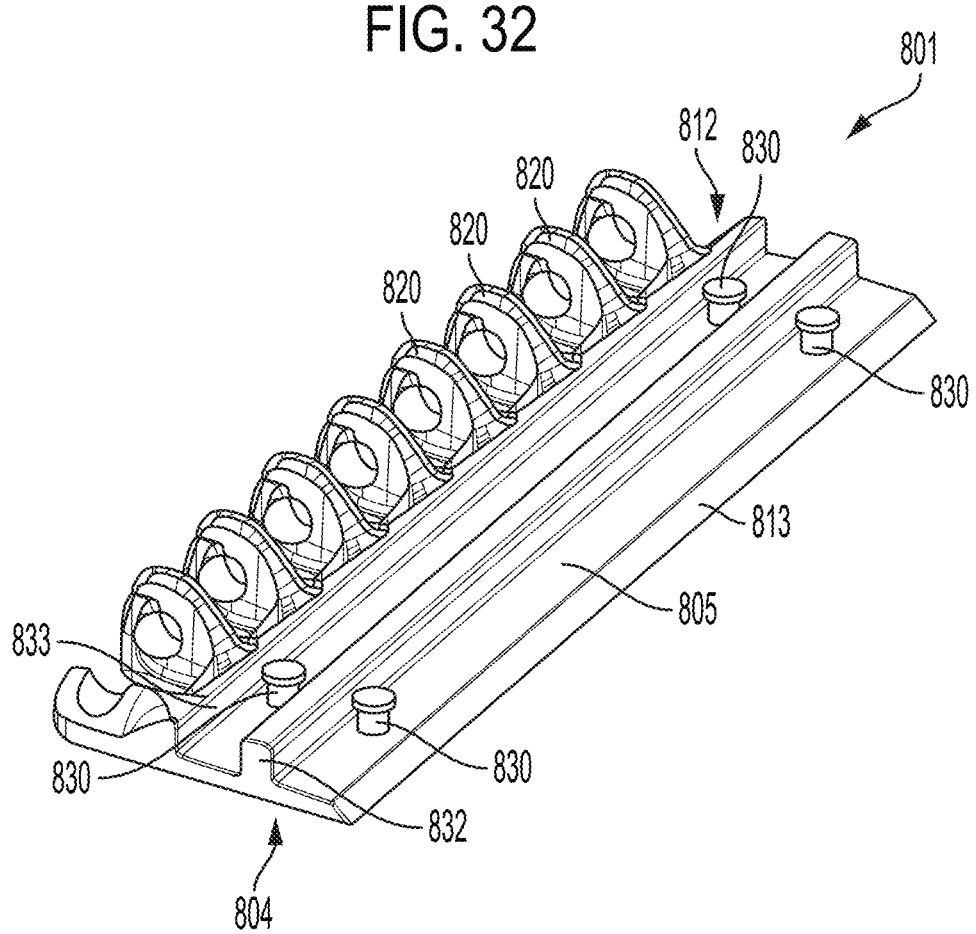
FIG. 33 is a bottom view of the top mating portion of the dedicated access module of FIG. 30.

Shaped openings 840 are formed in the body of the second mating portion 802, opening to the upper surface 806. A first pair of shaped openings 840 straddles the lateral channel 834 at a first side of the second mating portion 802 and a second pair of openings 840 straddles the drive element 814 at a second side of the second mating portion 802. As shown in FIG. 32, the shaped openings 840 are pear-shaped, having a rounded first portion 841 and a rounded second portion 842 wider than the rounded first portion 841.

The shaped protrusions 830 of the first mating portion 801 are configured to be inserted through the wider portion 841 of the shaped openings 840. In the illustrative embodiment, the shaped protrusions 830 include a narrow neck and a wider head that can fit into the rounded second portion 842 of a shaped opening 840. The use of a wider head may give resistance to bending movements.

Figure 34:
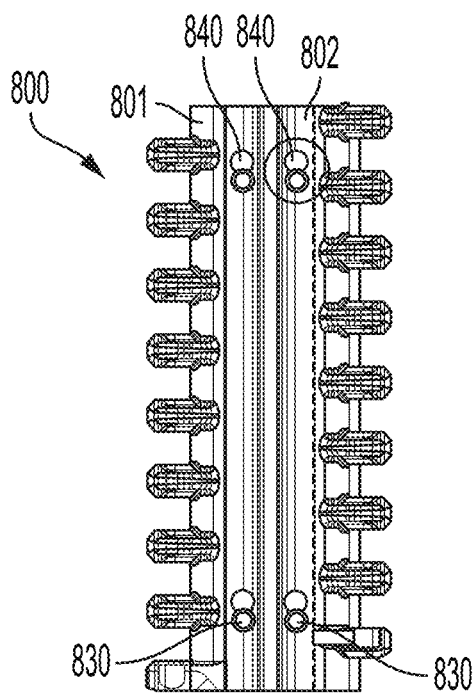
FIG. 34 is a bottom view of the assembled dedicated access module of FIG. 30.
Figure 35:
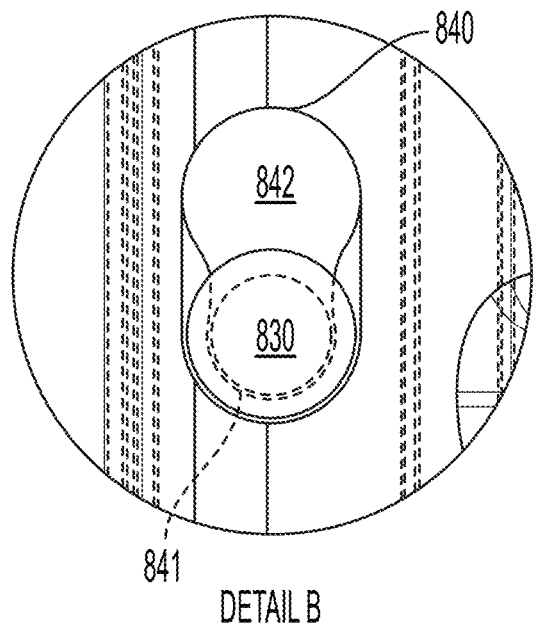
FIG. 35 is a detailed view of a shaped opening and protrusion of the assembled dedicated access module of FIG. 34.
Figure 36:
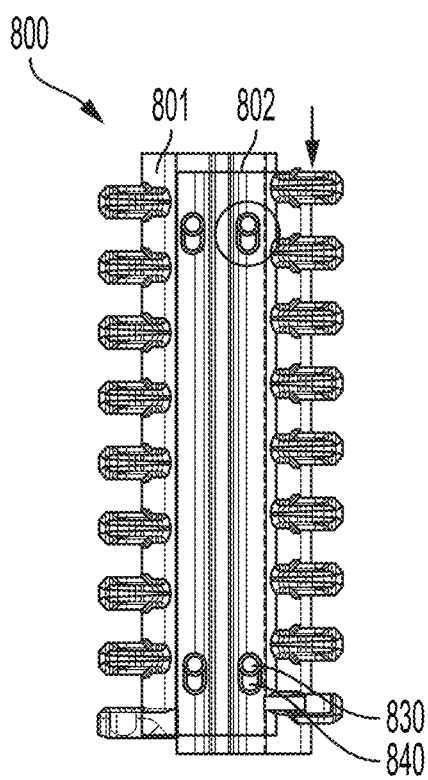
FIG. 36 is a bottom view of the dedicated access module of FIG. 30 during unlocking.
Figure 37:
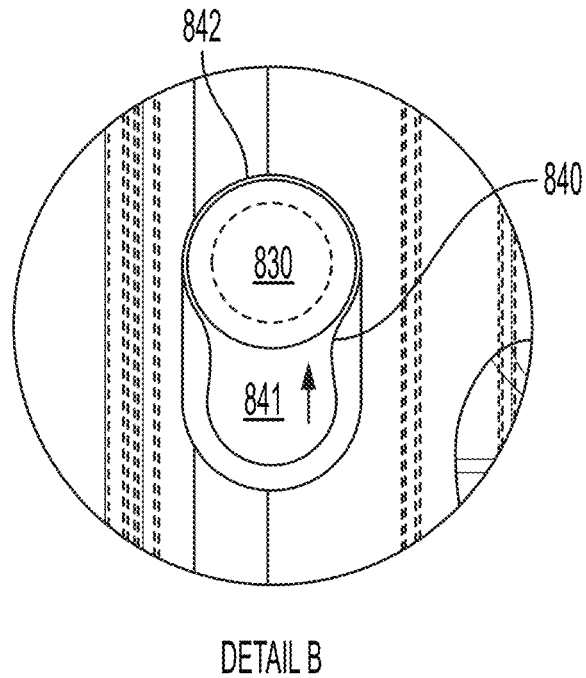
FIG. 37 is a detailed view of a shaped opening and protrusion of the dedicated access module of FIG. 36.
Figure 38:
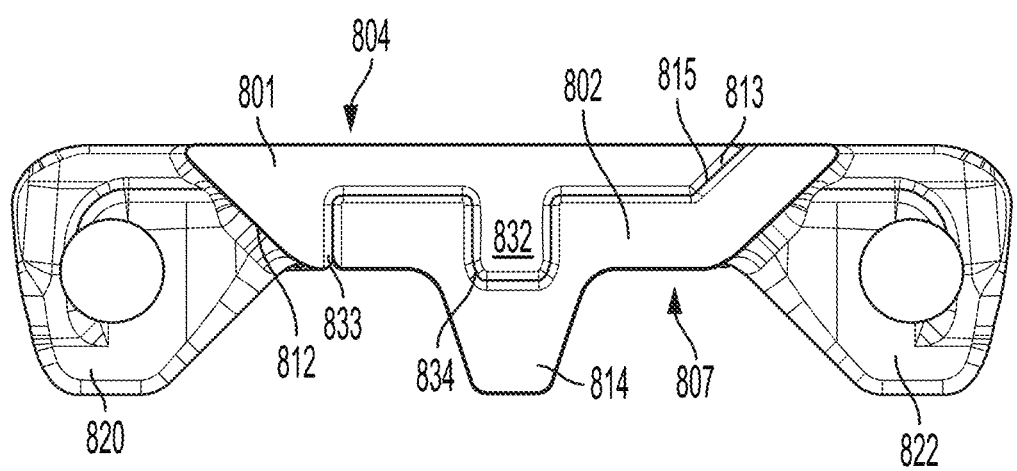
FIG. 38 is a cross-sectional view of the assembled dedicated access module of FIG. 30.

Referring to FIGS. 34-37, the dedicated access module 800 may be assembled and disassembled by laterally shifting the mating portions 801, 802 relative to each other. When the shaped protrusions 830 align with the narrower portion 841, the first and second mating portions 801, 802 are locked together, as shown in FIG. 34. A user can disengage the mating portions 801, 802 by sliding the mating portions relative to each other, allowing the shaped protrusions 830 to slide within the shaped openings 840 into the wider portion 842. Then, the mating portions 801, 802 can be separated by pulling the mating portions apart vertically to open a conveyor belt employing the dedicated access module 800. A user can conversely mate the shaped protrusions 830 and shaped openings 840 and slide the mating portions into engagement to close a conveyor belt employing the dedicated access module 800.

In one embodiment, the illustrative shaped openings 840 are slightly necked-down between the wider portion 842 and narrow portion 841 so that some force is needed to unlock and lock the two mating portions 801, 802, creating a snap-fit connection, but the invention is not so limited.

Referring to FIGS. 39-48, another embodiment of a dedicated access module 900 comprises overlapping mating portions 901, 902 that snap together to form the complete dedicated access module 900. A first, upper mating portion 901 comprises a body having a top surface 910 terminating in an angled, laterally-extending inner end 911 and having a series of standard, articulatable hinge elements 920 at an outer end. The first mating portion 901 includes a through opening 912 in the upper surface 910 configured to receive a thumb pad 930 of the second mating portion 902. When assembled, the top surface of the thumb pad 930 is flush with the top surface 910 of the first mating portion 901.

As shown in FIG. 41, at a first side, the first mating portion 901 forms a drive element portion 913 on a bottom surface opposite the top surface 910. At the second side opposite the opening 912, the first mating portion 901 includes an angled protrusion 940 configured to be received in a complementary channel 950 (shown in FIGS. 42 and 43) on the second mating portion 902, to transmit load between the two mating portions 901, 902 during operation and prevent disengagement during operation of a conveyor belt employing the dedicated access 900. An angled abutment surface 943 extends at an outer end of the body of the first mating portion 901, connecting the articulatable hinge elements 920 to the bottom surface of the mating portion 901. The thickness of the top deck of the illustrative first mating portion 901 is not uniform, to optimize stress throughout the module, but the invention is not so limited.

The second, lower mating portion 902 further includes a body having a top surface 921, an opposite bottom surface 952 and a series of standard, articulatable hinge elements 922 at an outer end. The second mating portion body steps down at angled edge 923 and includes a side gap where a solid portion of the first mating portion including the drive element portion 913 of the first mating portion 901 fits. The second mating portion body terminates at an angled inner edge 954. The second mating portion 902 incudes a solid, stepped down portion 925 from which the thumb pad 930 protrudes. The lateral channel 950 for receiving the angled protrusion 940 is also formed in the solid stepped down portion 925. The angled interface causes the two halves 901, 902 to pull together vertically, making it difficult to disengage the module.

The second mating portion 902 further includes a drive element 914 extending from the bottom surface 952. When the first and second mating portions 901, 902 are joined, the drive element portion 913 abuts the drive element 914 for form a drive bar extending laterally along the bottom surface of the dedicated access module 900.

When mated, the angled protrusion 940 is received in channel 950, surfaces 911 and 923 abut each other and surfaces 954 and 943 abut each other.

Figure 46:
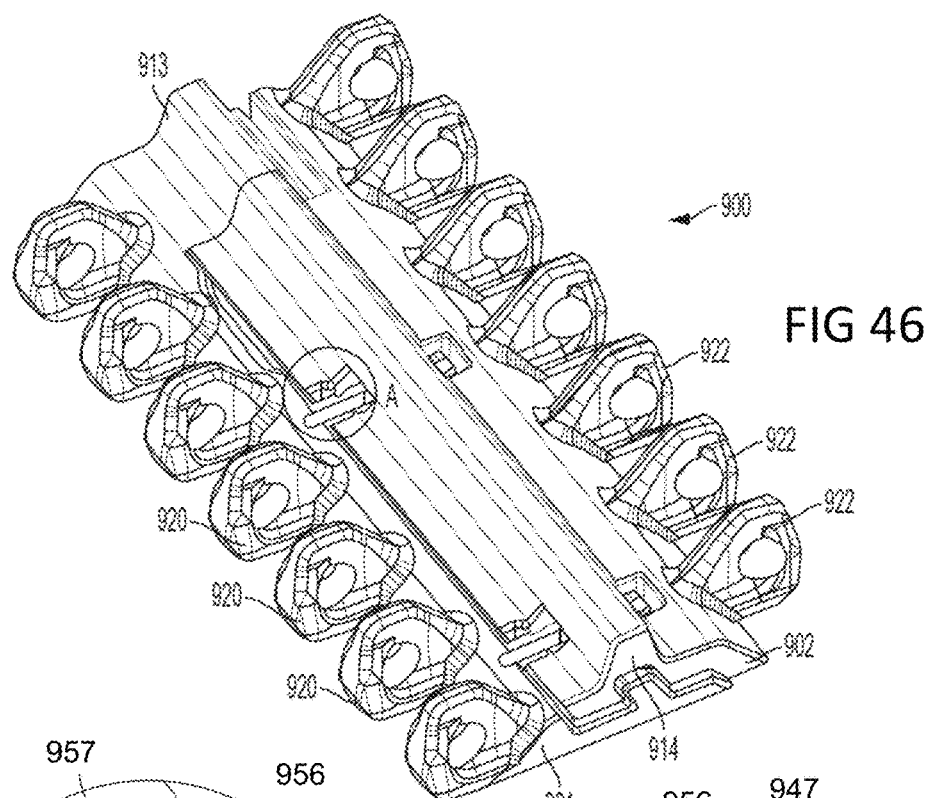
FIG. 46 is a bottom view of the dedicated access module of FIG. 39 during disassembly.
Figure 47:
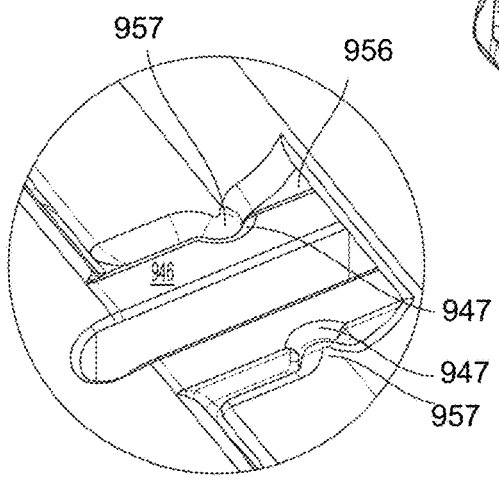
FIG. 47 is a detailed view of a lock on the module of FIG. 46.
Figure 48:
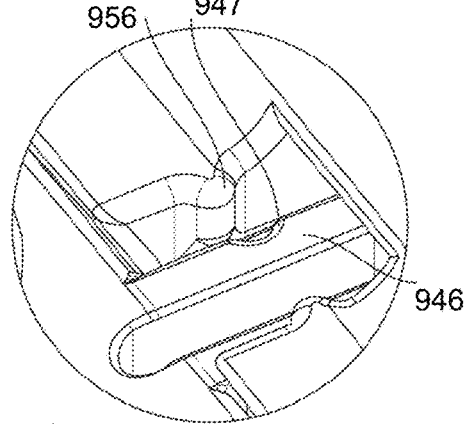
FIG. 48 is a detailed view of the lock of FIG. 47 during disassembly.
Figure 49:
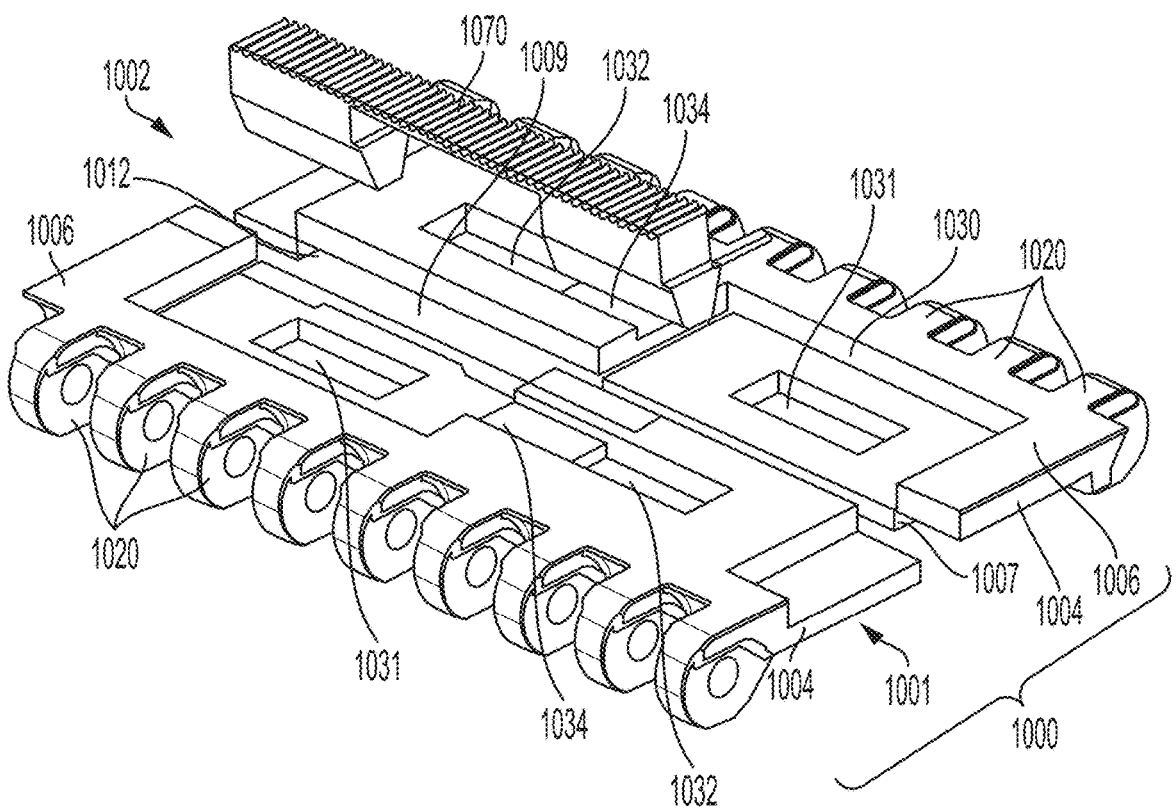
FIG. 49 is an exploded view of a dedicated access module comprising mating portions configured to receive a slidable locking element according to another embodiment.

Locking channels 956 in the solid, stepped down portion 925 of the second mating portion 902 may receive corresponding locking bars 946 on the first mating portion 901 to provide a snap-fit connection between the first and second mating portions 901, 902. The locking channels 956 include lateral locking protrusions 957 configured to engage recesses 947 in the locking bars 946, as shown in FIGS. 46-48. As shown in FIGS. 46 and 47, when assembled, the drive element portions 913, 914 align to form a lateral drive element on the bottom of the dedicated access module 900. During engagement of the two mating portions 901, 902, recesses 947 on the locking bars 946 receive and engage the protrusions 957. The engagement may be a snap fit.

The illustrative locking bars 946 include a central cut out to allow the locking bar to flex during engagement to control the intensity of the snap fit.

Figure 45:
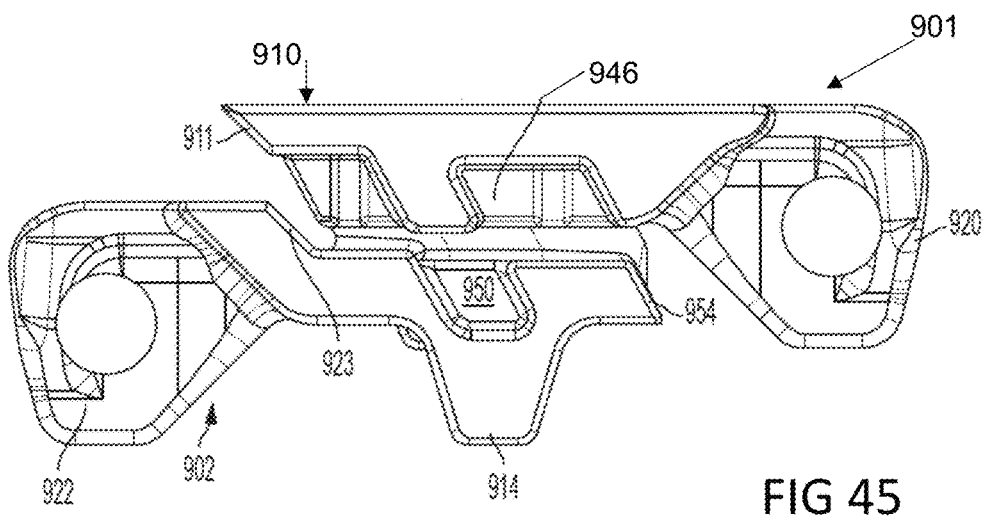
FIG. 45 is a cross-sectional view of the dedicated access module of FIG. 39 during disassembly.

A user can press down on the thumb pad 930 to release the snap-fit and pull the two mating components 901, 902 apart to open a conveyor belt employing the dedicated access module 900, as shown in FIGS. 45 and 48.

FIGS. 49-52 show another embodiment of a dedicated access module 1000 for a conveyor belt comprising first and second mating portions 1001, 1002 and a slidable locking element 1070 for securing the first and second mating portions 1001, 1002 together to form the dedicated access module 1000. The illustrative mating portions 1001, 1002 are identical, and are reversed to face and mate with each other.

Each mating portion 1001, 1002 comprises a body portion 1004 having articulatable hinge elements 1020 at an outer end, an inner end 1009, a top conveying surface 1006 and an opposite bottom surface 1007. The illustrative body portion 1004 is tiered to form recesses for receiving complimentary parts of the other mating portion. A first recess 1030 with a through opening 1031 to the bottom surface 1007 is inset from a first side of the body 1004. The first recess 1030 and is open to the inner end 1009 of the body 1004. The body 1004 further includes a through opening 1032 extending from the top surface 1006 to the bottom surface 1007 that aligns with the through opening 1031 longitudinally and is spaced the same distance from the second side of the belt as the through opening 1031. A lateral channel 1034 open to the top surface 1006 connects the through opening 1032 with the recess 1030. The body 1004 further includes a side recess 1011 forming a ledge so that the second side of the body 1004 is stepped down from the top surface 1006.

Figure 50:
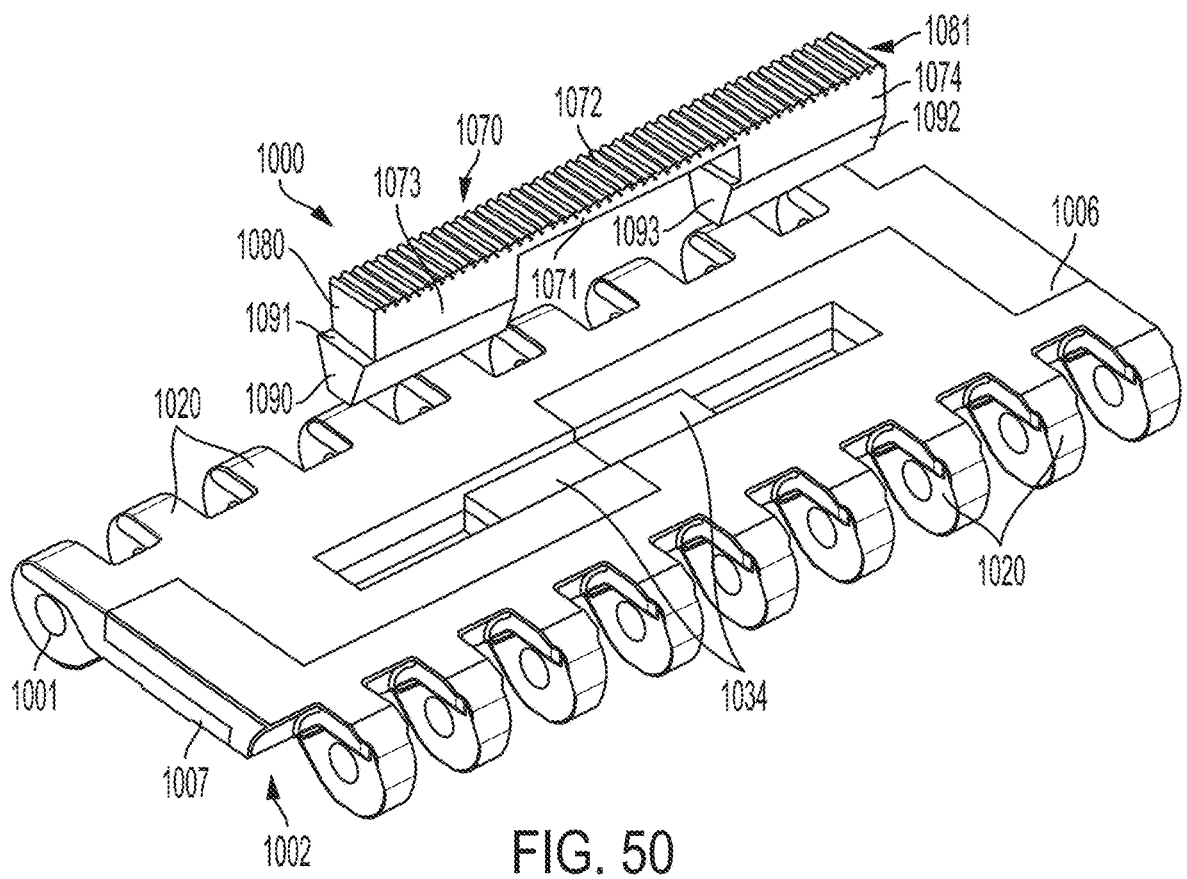
FIG. 50 is a partially exploded view of the dedicated access module of FIG. 49.
Figure 51:
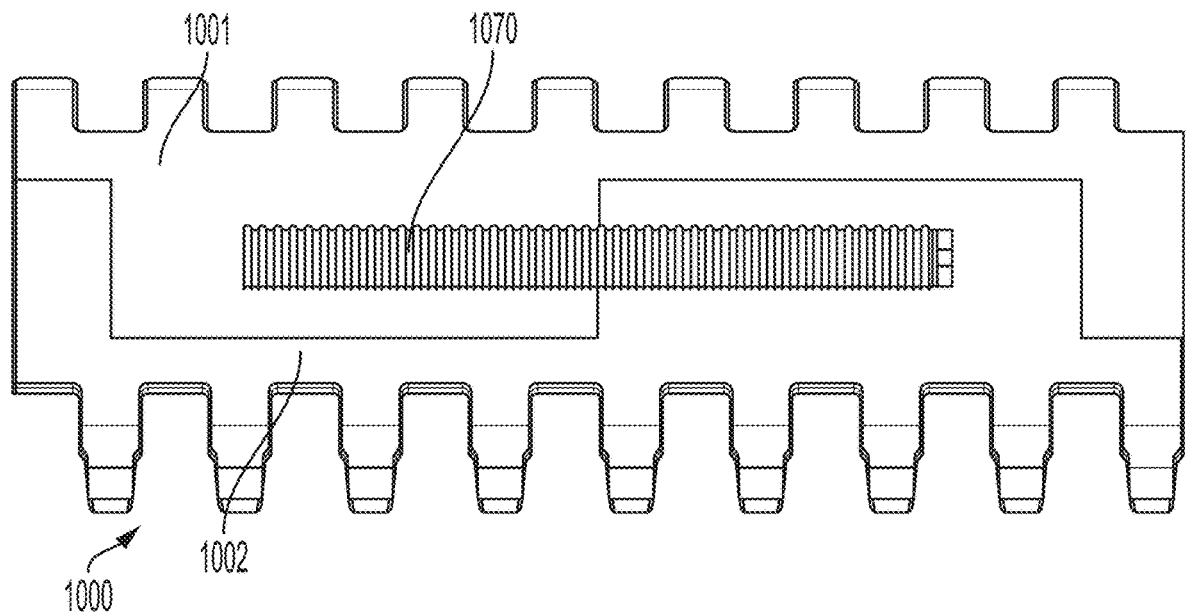
FIG. 51 is a top view of the dedicated access module of FIG. 49 in an assembled, locked position.

Each mating portion 1001, 1002 further include a niche 1012 in the bottom surface 1007 that is open to the inner end 1009 below the through opening 1032 and lateral channel 1034. The niche 1012 is configured to receive the portion of the body 1004 below the recess 1030 and containing the through opening 1031 of the other mating portion, so that when mated, openings 1031, 1032 in each portion align vertically, and the lateral channels 1034 align to form a longer channel extending between the aligned openings 1031, 1032, as shown in FIG. 50. Gaps between the different tiers in the body 1004 facilitate joining of the mating portions 1001, 1002.

The illustrative slidable locking element 1070 comprises a planar portion 1071 extending from a first side 1080 to a second side 1801 and having a top surface 1072 that is ribbed or otherwise textured to facilitate manipulation by a user. A first protrusion 1073 extends down from the first side of the planar portion 1071 having walls flush with the first side and front and end walls of the planar portion. A drive tooth element 1090 extends down from the first protrusion 1073 and includes a projecting edge 1091. A second protrusion 1074 extends down from the second side of the planar portion 1071 and includes a drive tooth element 1092 and projecting edge 1093.

Figure 52:
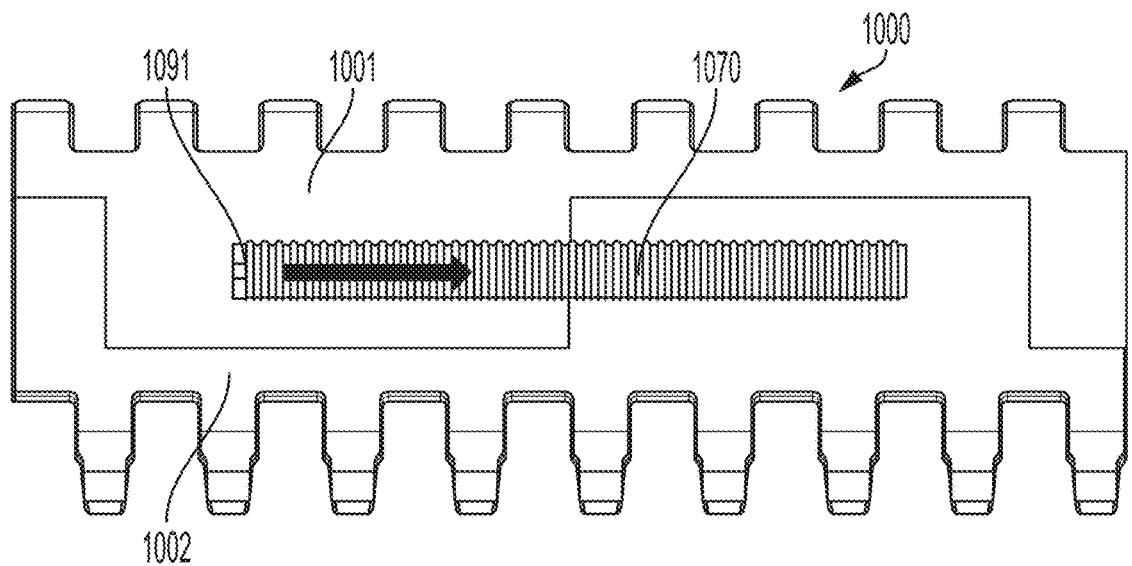
FIG. 52 is a top view of the dedicated access module of FIG. 51 in an assembled, unlocked position.

The planar portion 1071 of the slidable locking element 1070 sits in channel 1034, with protrusions 1073, 1074 extending through the aligned openings in the mating portions 1001, 1002 so the drive elements 1090, 1092 protrude from the bottom. In a latched position, shown in FIG. 51, the slidable locking element 1070 is pushed to the first side of the module, so that the projecting edges 1091, 1093 engage the bottom of the module and prevent the slidable locking element 1070 from being removed, thereby keeping the mating portions 1001, 1002 engaged. To disengage the mating portions 1001, 1002, the slidable locking element 1070 slides within the channel, as shown in FIG. 52, to expose the projecting edges 1091, 1093, allowing removal of the slidable locking element 1070 and disengagement of the mating portions 1001, 1002.

Figure 53:
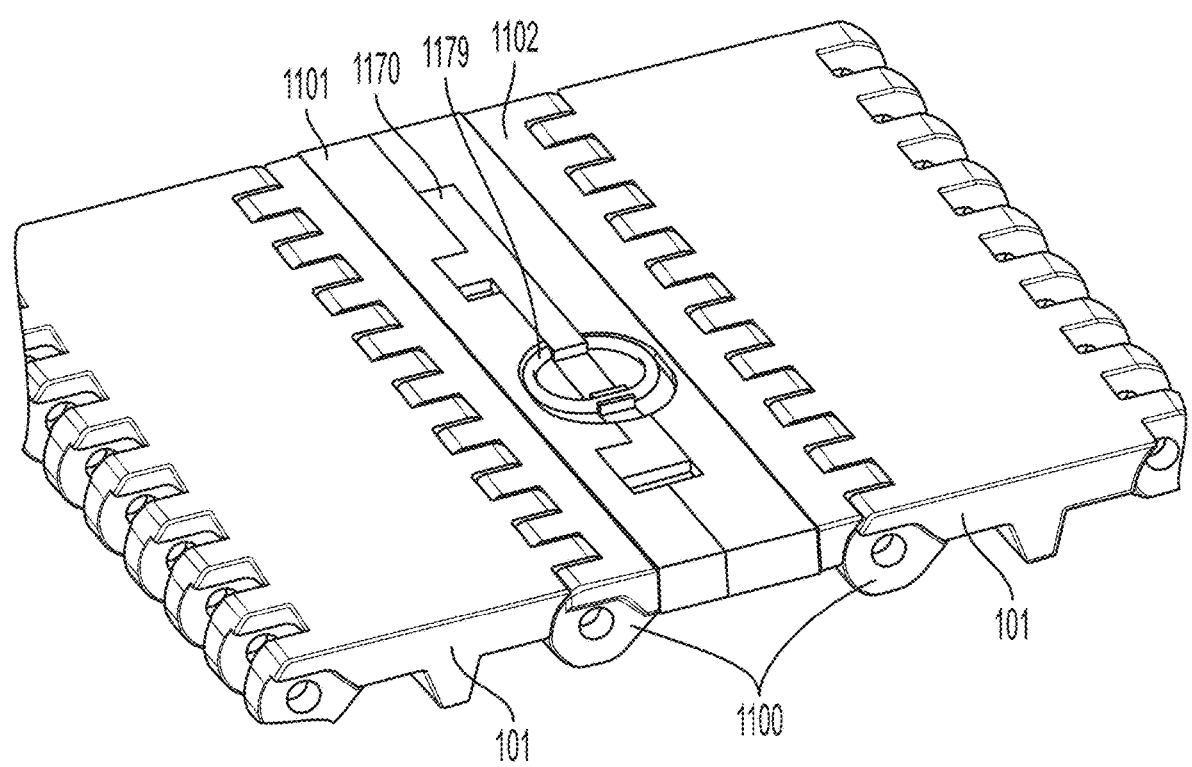
FIG. 53 shows a portion of a conveyor belt including a dedicated access module including a latchable, sliding locking element according to another embodiment.
Figure 54:
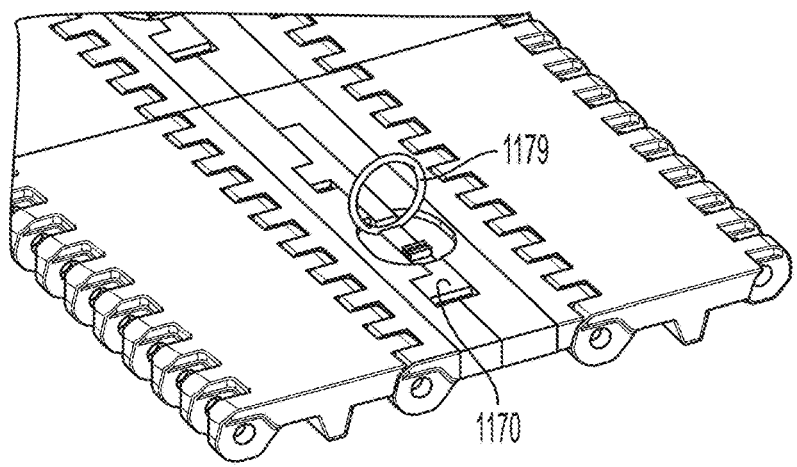
FIG. 54 shows the dedicated access module portion of FIG. 53 during initial disengagement.
Figure 55:
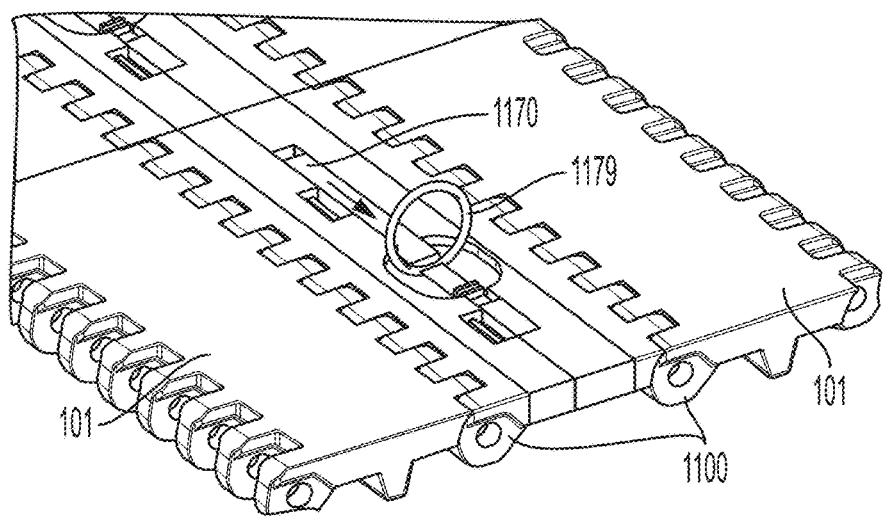
FIG. 55 shows the dedicated access module portion of FIG. 53 after sliding the latchable, sliding locking element out of engagement.
Figure 56:
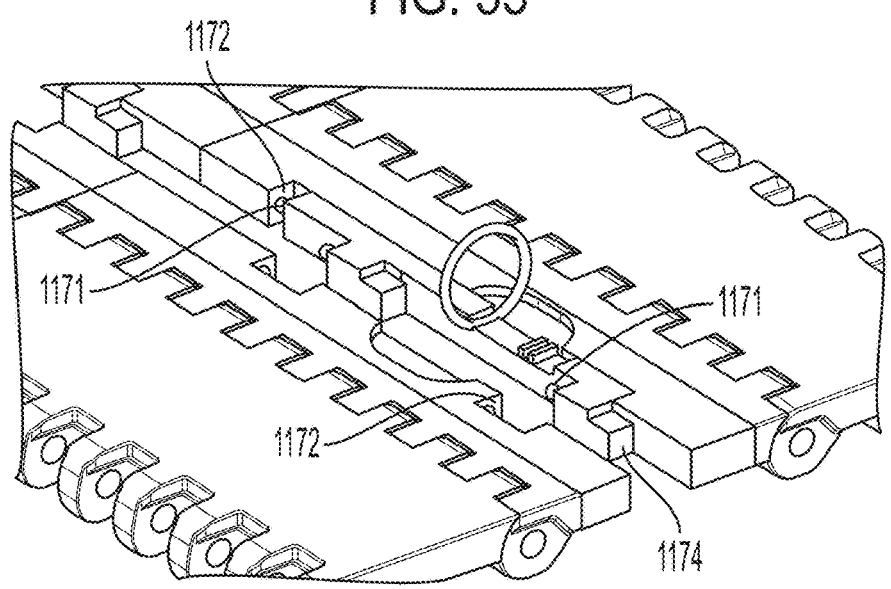
FIG. 56 shows the dedicated access module portion of FIG. 53 after separation of the mating portions of the dedicated access module.

Referring to FIGS. 53-56, another embodiment of a dedicated access module 1100 suitable for connecting standard conveyor belt modules 101 comprises mating portions 1101, 1102 joined by latching slidable locking element 1170. The latching slidable locking element 1070 includes locking pins that 1171 are received in corresponding openings 1172 in the mating portions 1101, 1102 and protruding ledge 1174 that are received in nooks (not shown). A locking ring 1179 is rotatably connected to slidable locking element 1170. The illustrative locking ring 1179 keeps the slidable locking element 1170 in place through an interference fit with a recess, as shown in FIG. 53. To open the dedicated access module, the locking ring 1179 is lifted, as shown in FIG. 54, freeing the locking element 1170. As shown in FIG. 55, the slidable locking element can slide towards one side of the dedicated access module 1100 to disengage the mating portions 1102, 1102 and allow them to separate, as shown in FIG. 56.

Figure 57:
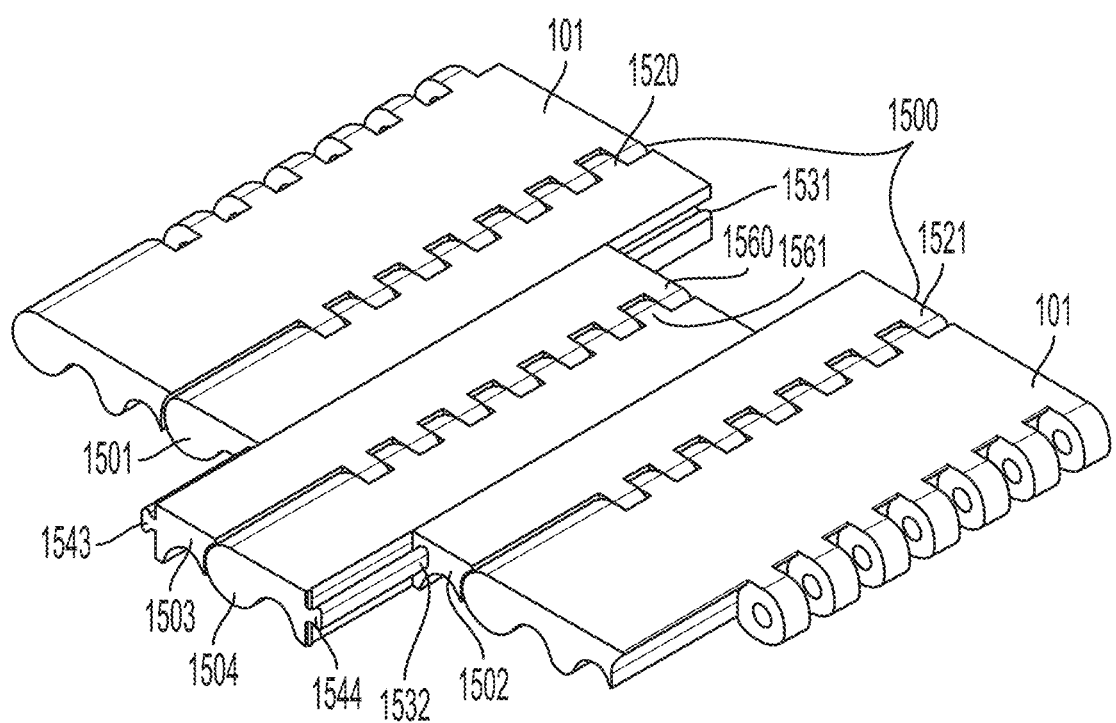
FIG. 57 is an isometric view of another dedicated access module including a snap-together components according to another embodiment.
Figure 58:
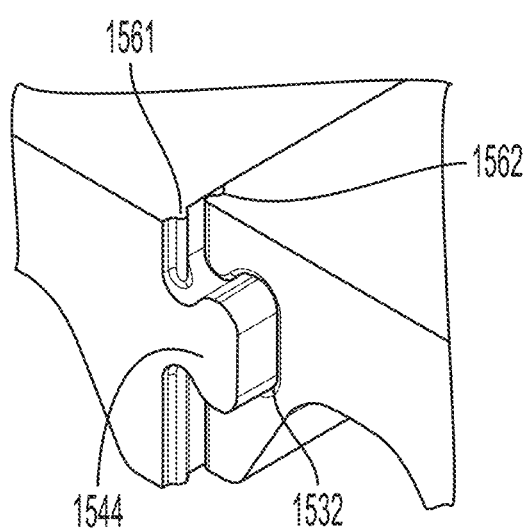
FIG. 58 is a detailed view of a portion of the dedicated access module of FIG. 57 before snapping the components together.
Figure 59:
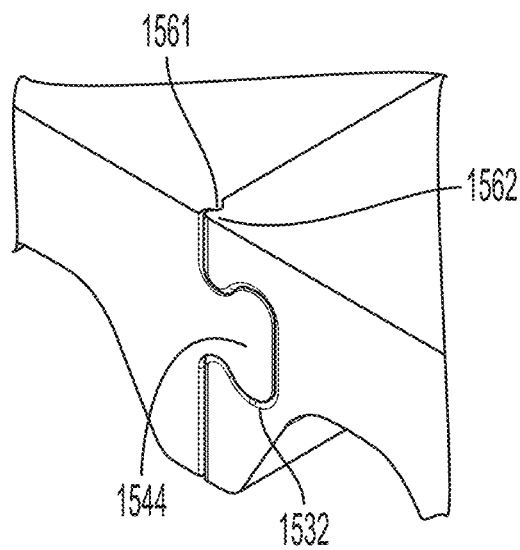
FIG. 59 shows the portion of FIG. 57 after snapping the components together.
Figure 60:
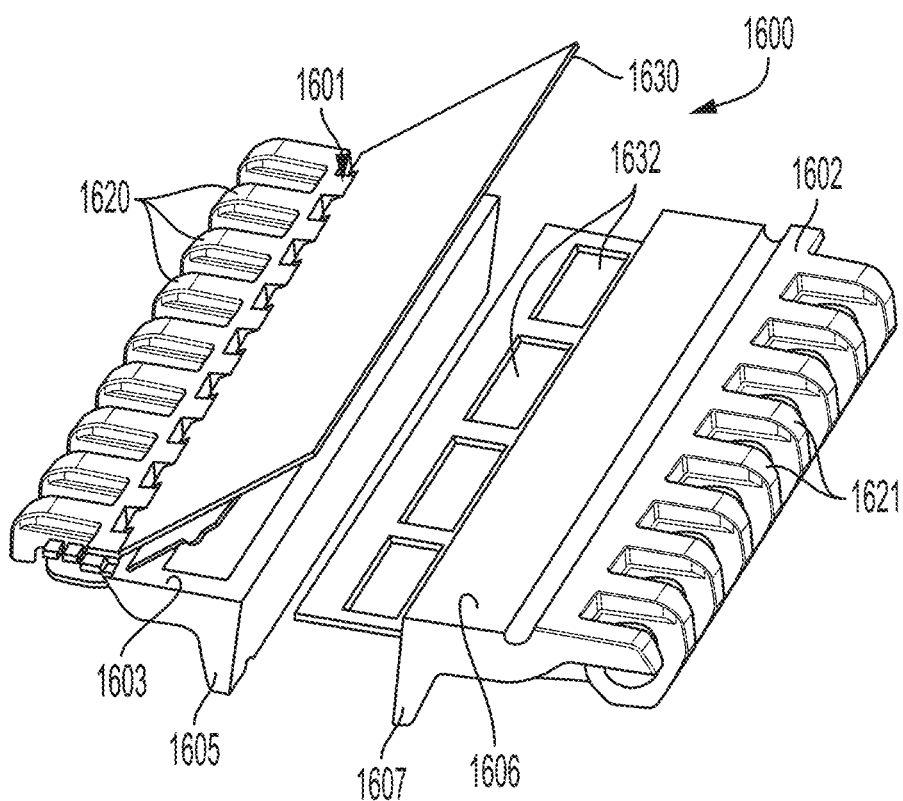
FIG. 60 is an isometric view of another embodiment of a dedicated access module.
Figure 61:
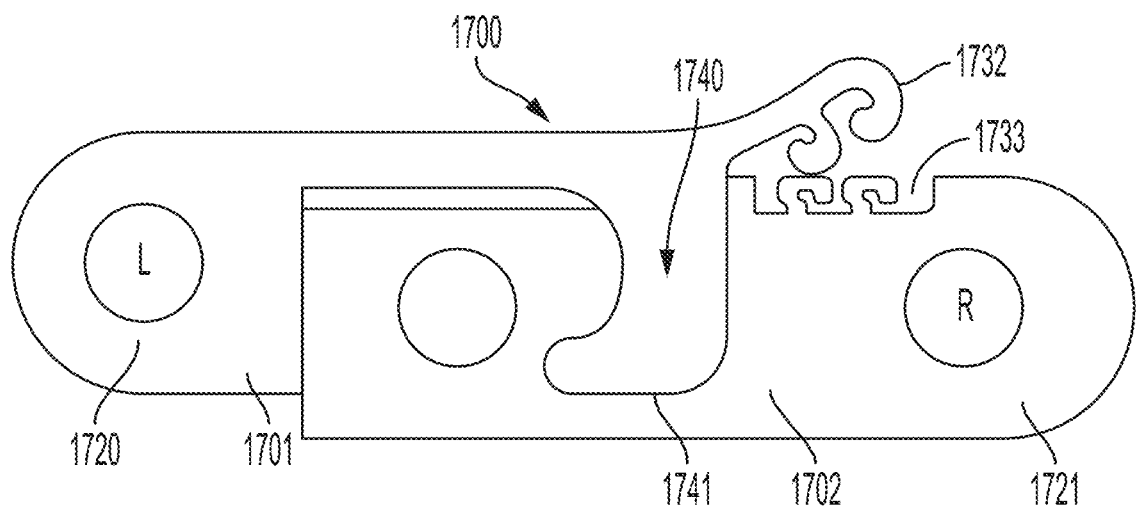
FIG. 61 is a cross-sectional side view of another embodiment of a dedicated access module including a "zip lock" connector.
Figure 62:
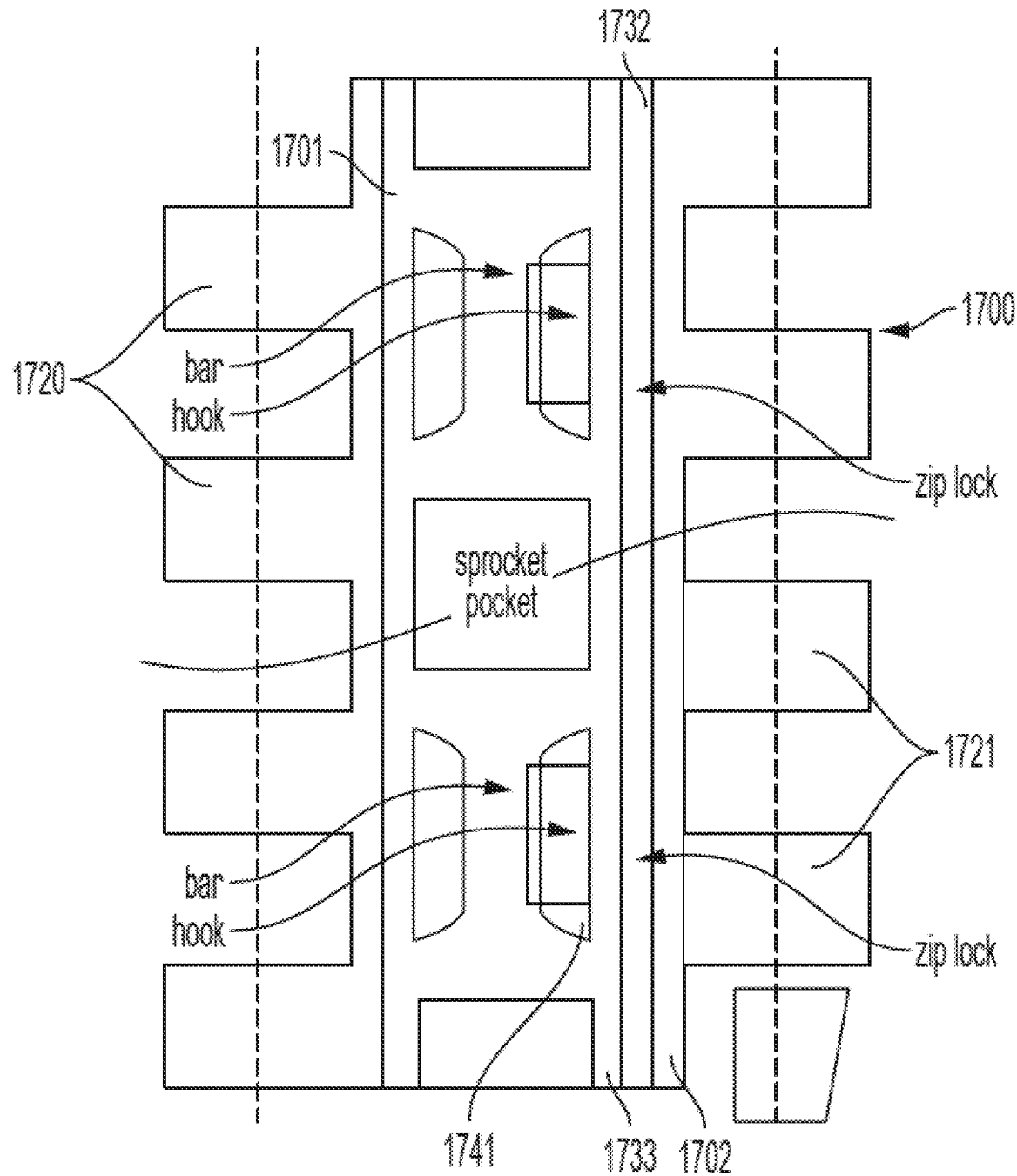
FIG. 62 is a top view of the dedicated access module of FIG. 61.
Figure 63:
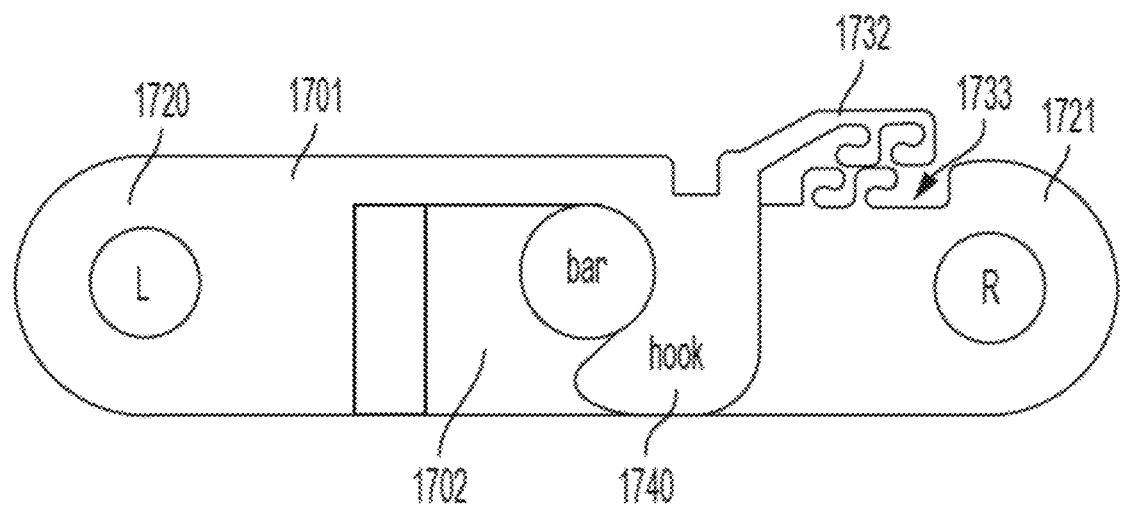
FIG. 63 shows the dedicated access module of FIG. 61 during locking of the components.
Figure 64:
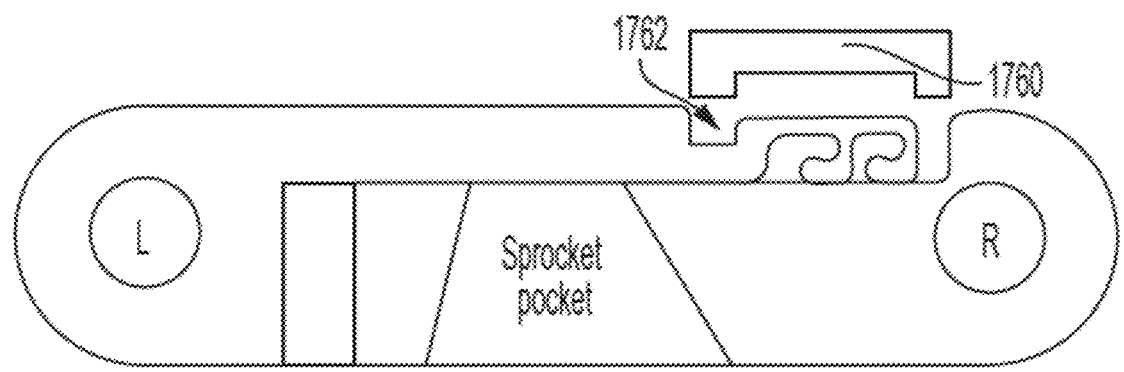
FIG. 64 shows the dedicated access module of FIG. 61 during locking of the components using a sliding tool.

Referring to FIGS. 57-59, in another embodiment, a dedicated access module 1500 comprises four mating portions 1501, 1502, 1503, 1504. Outer mating portions 1501, 1502 mate with standard conveyor belt modules 101 via articulatable hinge elements 1520, 1521 and include channels 1531, 1532 on inner ends for connecting to inner modules 1503, 1504 via dovetail projections 1543, 1544 and the outer ends of the inner mating portions 1503, 1504. The inner modules 1503, 1504 connect at inner ends via standard hinge elements 1560, 1561. To open the conveyor belt, the connected inner mating portions 1503, 1504 slide relative to the outer mating portions 1501, 1502. As shown in FIGS. 58 and 59, a snap-fit lock secures the outer mating portions to the inner mating portions. The snap-fit lock comprises a vertical protrusion 1561 that engages a vertical recess 1562 and can be disengaged by a user. FIG. 60 shows an embodiment of a dedicated access module 1600 suitable for forming a dedicated opening and closing point in a conveyor belt according to another embodiment. The dedicated access module 1600 comprises mating portions 1601, 1602 that connect at outer ends to standard conveyor belt modules via standard hinge elements 1620, 1621. The first mating portion 1601 includes a body having a recessed upper surface 1603, a laterally-extending drive element portion 1605 at an inner end. A lift lever 1630 is pivotally mounted to the body of the first mating module for latching the mating portions 1601, 1602 together. The second mating portion 1602 includes a body having a recessed upper surface 1606, a laterally-extending drive element portion 1607 that abuts the portion 1605 to form a full drive tooth when the module 1600 is assembled, and openings 1632 that receive protrusions on the lift lever 1630 to secure the mating portions 1601, 1602 together. During operation, the lift lever 1630 secures the mating portions together 1601, 1602. The mating portions can be separated to open the conveyor belt by lifting the lift lever 1630 and pulling the mating portions 1601, 1602 apart.

Referring to FIGS. 61-64, another embodiment of a dedicated access module 1700 comprises mating portions 1701, 1702 that include a "zip lock" type of connector to form a dedicated opening and closing point in a conveyor belt. A first mating portion 1701 includes standard hinge elements 1720 on an outer end, and a strip of flexible projections 1732 at an inner end. Hooks 1740 extend downwards to facilitate the connection. The second mating portion 1702 includes standard hinge elements 1721 and a body configured to engage and lock to the first mating portion 1701. The first mating portion 1701 overlies the second mating portion 1702, which includes receptacles 1741 in select locations for receiving the hooks 1740. A groove 1733 includes recesses and hooks configured to engage and lock to the strip of flexible projections 1732. The strip of flexible projections 1732 can be pressed into the groove 1733 to lock the portions together and be readily reopened. A tool 1760 may be received in the groove 1733 and a recess 1762 in the upper surface of the first mating portion 1701 to help engage the flexible projections 1732 and the hooks in the groove 1733.

Figure 65:
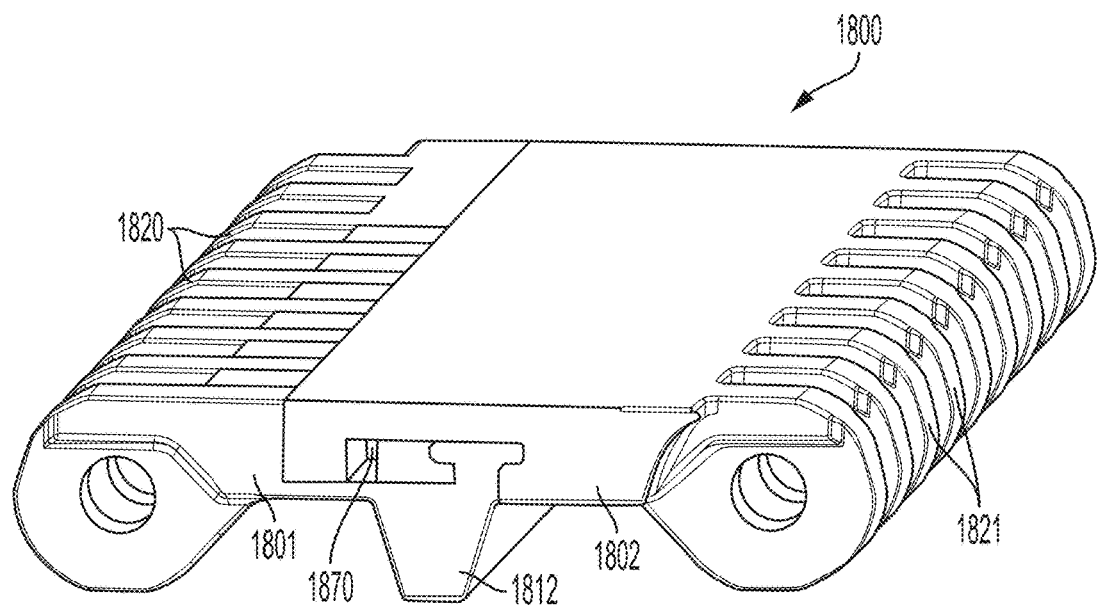
FIG. 65 is an isometric view of a dedicated access module according to another embodiment.
Figure 66:
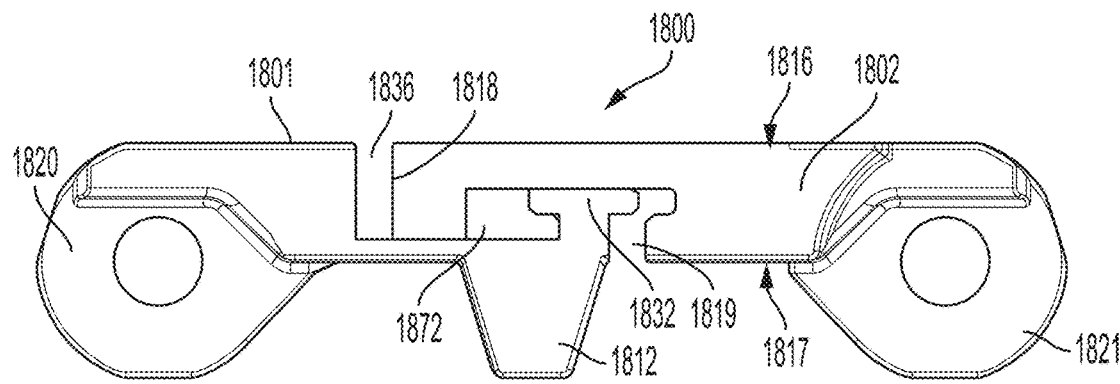
FIG. 66 is a side view of the dedicated access module of FIG. 65.
Figure 67:
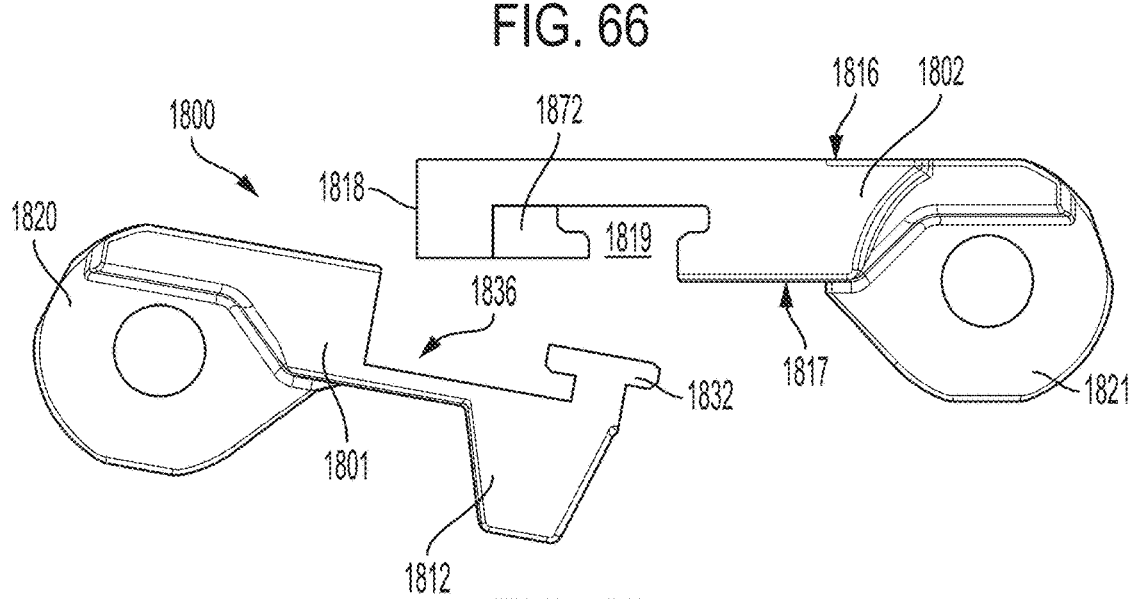
FIG. 67 is a side view of the dedicated access module of FIG. 65 during separation.
Figure 68:
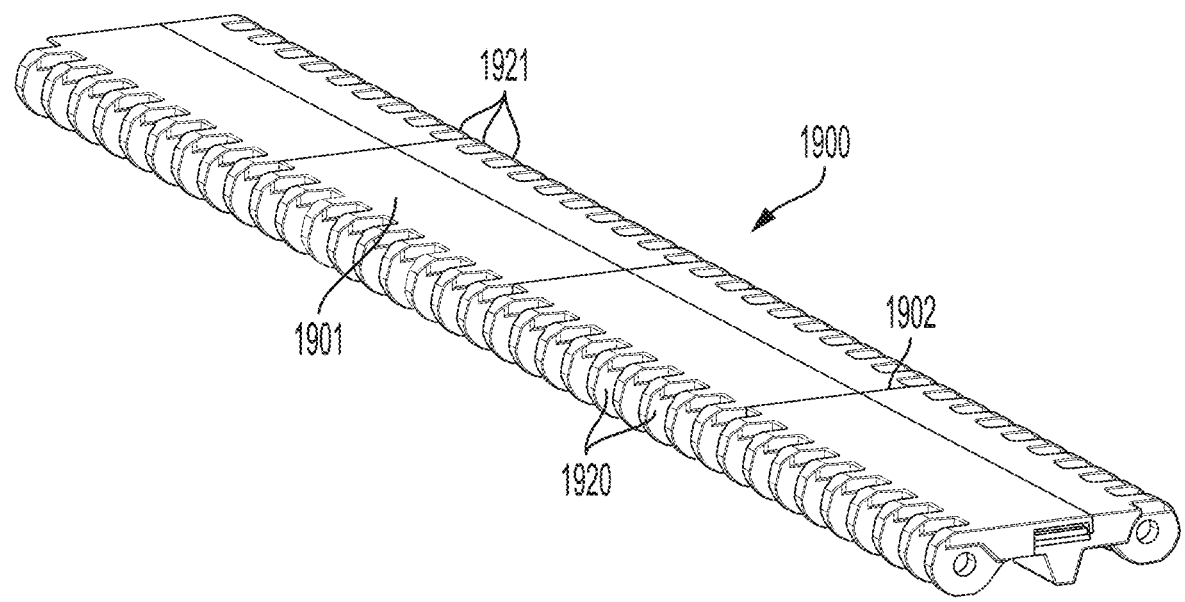
FIG. 68 is an assembled isometric view of a dedicated access module of another embodiment.

FIGS. 65-67 show another embodiment of a dedicated access module 1800 for a conveyor belt. The dedicated access module comprises first and second mating portions 1801, 1802, each comprising a set of standard hinge elements 1820, 1821 on an outer end. The mating portions 1801, 1802 are configured to mate with each other at an inner end to form a dedicated access point. The first mating portion includes a bottom surface forming a drive tooth 1812 and an upper surface including a recess 1836 with a T-shaped protrusion 1832. The second mating portion includes a substantially flat top surface 1816 extending to an inside edge 1818 and a bottom surface 1817 including a T-shaped recess 1819 for receiving the T-shaped protrusion 1832. The T-shaped recess 1819 is longer than the T-shaped protrusion 1832. One or more compression springs 1870 biases the mating portions 1801, 1802 into engagement. A slider 1872 forms a portion of the T-shaped recess 1819 and fits in the space between the T-shaped protrusion 1832 and the compression spring 1870, which is between the slider 1872 and the inside edge 1818 of the second mating portion 1802.

When there is no tension in the associated conveyor belt employing the dedicated access module 1800, the compression spring 1870 biases the two mating portions 1801, 1802 together, as shown in FIG. 65. When the conveyor belt runs, the tension pulls the two components apart, forming a small gap in the upper conveying surface, as shown in FIG. 66. The interference between the T-shaped recess 1819, slider 1872 and T-shaped component 1832 keep the two mating portions latched together.

To unlock the two mating portions 1801, 1802 for opening the conveyor belt or for another purpose, which is only possible when there is no tension in the conveyor belt (the conveyor belt must not be running), a user pushed the two mating portions together against the bias of the compression spring 1870, then unlatches the T-shaped protrusion 1832 from engagement with the slider 1872.

FIGS. 68-71 show another embodiment of a dedicated access module 1900 for a conveyor belt. The dedicated access module 1900 comprises two mating portions 1901, 1902, each comprising a set of standard hinge elements 1920, 1921 on an outer end. The mating portions 1901, 1902 include inner ends that mate with each other to form a complete module. The mating portions 1901, 1902 can be easily separated to open the conveyor belt.

Figure 70:
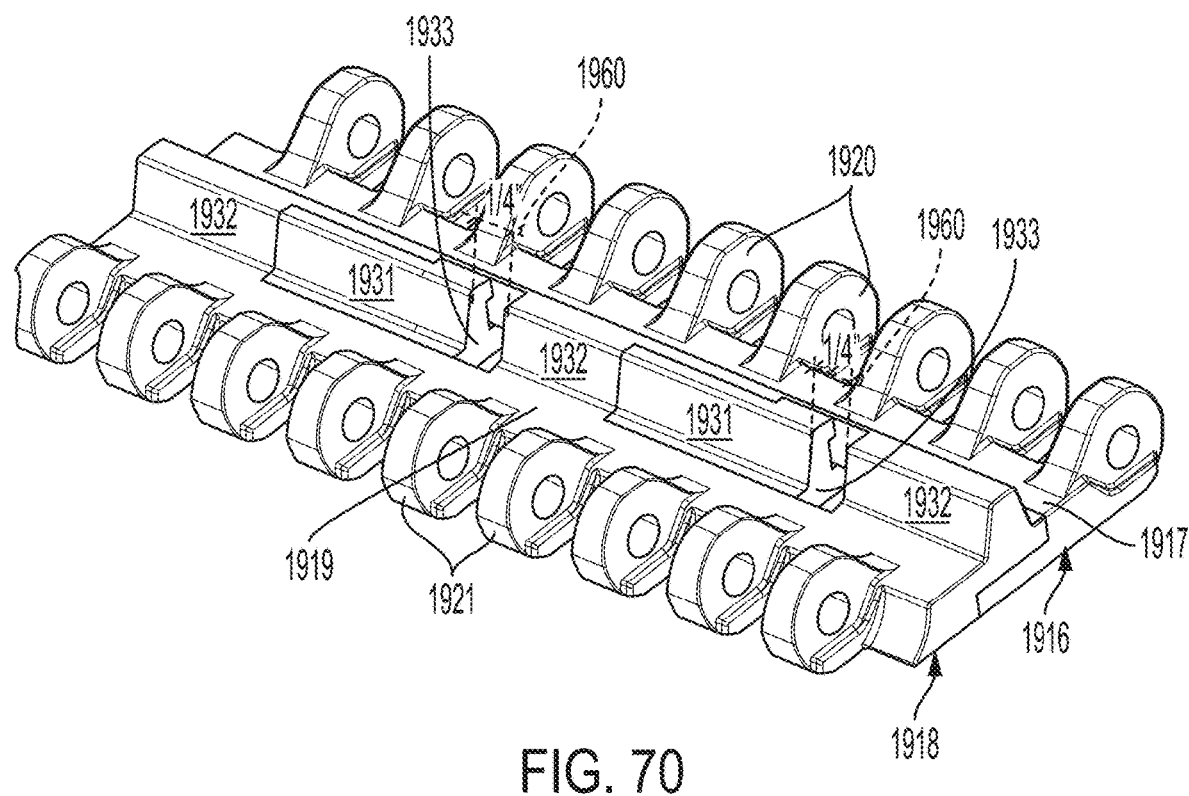
FIG. 70 is a bottom view of the dedicated access module of FIG. 68.

Each mating portion has a body extending from a top conveying surface, 1916, 1918 to a bottom surface 1917, 1919. A plurality of spaced-apart drive teeth 1931, 1932 extend from the bottom surfaces 1917, 1919. When the two portions 1901, 1902 mate, recesses and complementary protrusions fit together and the drive teeth interlace, as shown in FIG. 70 with gaps 1960 formed between one side of the first drive teeth 1931 and the second drive teeth 1932. In addition, the first drive teeth 1931 include lips 1933 that overlay a recess in the second drive teeth 1932 to provide a vertical lock between the mating portions 1901, 1902

Figure 69:
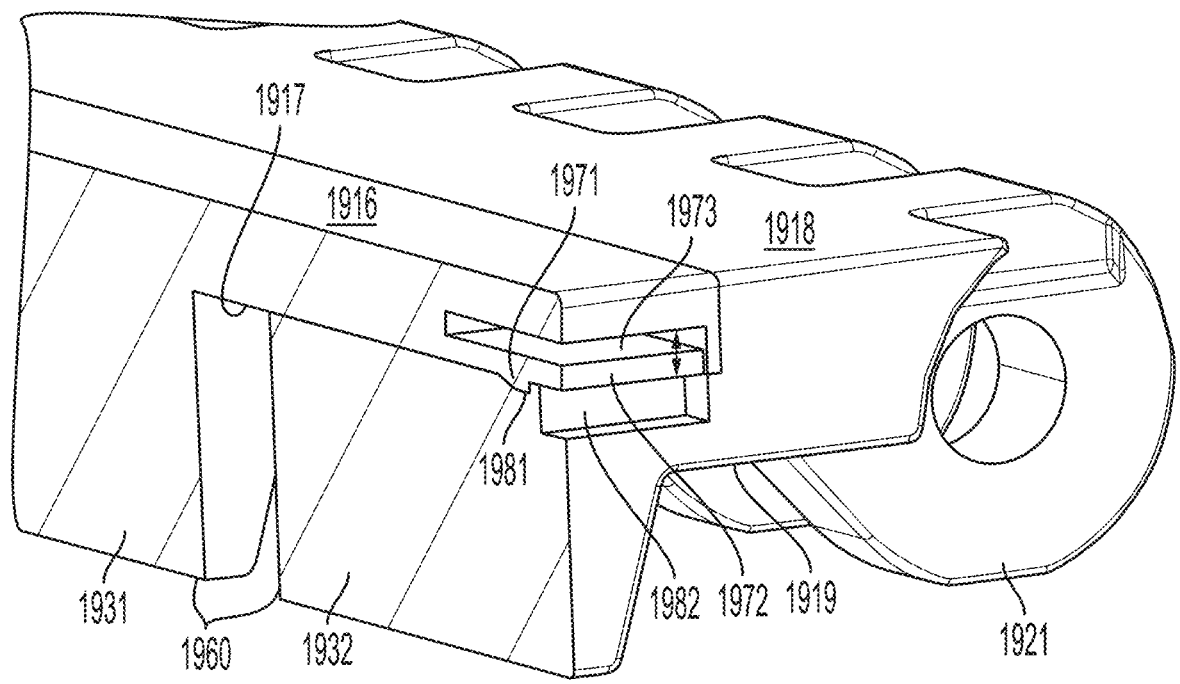
FIG. 69 is a detailed view of a side of the dedicated access module of FIG. 68.
Figure 71:
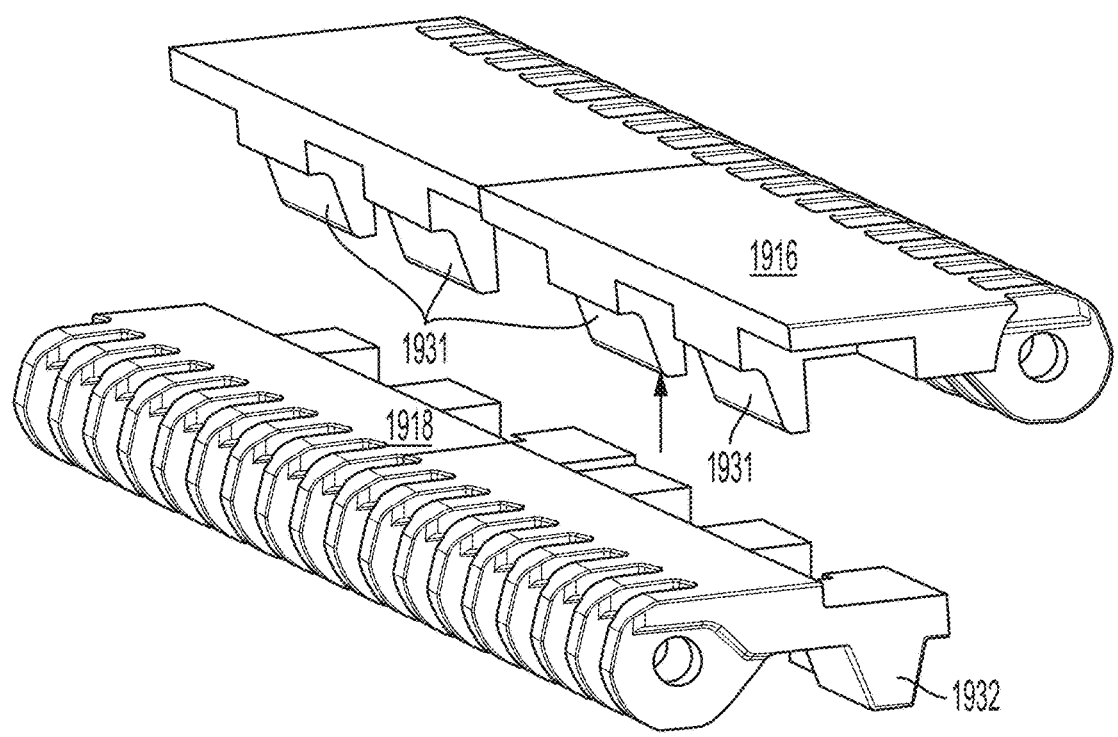
FIG. 71 is an isometric view of the dedicated access module of FIG. 68 when the components are separated.

Referring to FIG. 69, the mating portions 1901, 1902 are laterally locked together with a detent 1971 in the first mating portion that is received in a corresponding groove 1981 in the second mating portion. The detent 1971 extends from a flexible planar portion 1972, which is separated from a main body of the mating portion 1901 by a space 1973. A recess 1982 in the side surface of the second mating portion creates an overhang to facilitate access to the flexible planar portion 1972. To disassemble the module 1900, a user lifts the flexible planar portion 1972 to pull the detent 1971 from the groove 1981. Then, the user slides the portions 1901, 1902 relative to each other until the lips 1933 clear the second drive teeth 1932, allowing the mating portions to be pulled apart, as shown in FIG. 71. The sequence can be reversed to toollessly join the mating portions 1901, 1902.

The illustrative embodiments show a dedicated access module forming a dedicated opening and-or closing point in a modular conveyor belt using two mating portions. The invention is not limited to these illustrative embodiments. Those skilled in the art will recognize that modifications may be made without departing from the scope of the invention.

What is claimed is:

1. A dedicated access module for a conveyor belt, comprising:
   a first mating portion having a first set of articulatable hinge elements at an outer end and a first non-articulatable connection element at an inner end; and
   a second mating portion having a second set of articulatable hinge elements at an outer end and a second non-articulatable connection element at an inner end configured to engage the first non-articulatable connection element,
   wherein the first mating portion engages the second mating portion to form a dedicated access module having a top conveying surface and an opposite bottom surface having a laterally-extending drive element for engaging a drive for the conveyor belt.

2. The dedicated access module of claim 1, further comprising a connector for securing the first mating portion to the second mating portion.

3. The dedicated access module of claim 2, wherein the connector comprises an elongated shaft extending through a rectangular passageway formed by the non-articulatable connection elements, the elongated shaft including a cubic head, and a shaped protrusion that aligns with the drive element.

4. The dedicated access module of claim 3, wherein the elongated shaft includes an opening on a distal end for engaging a protrusion in the rectangular passageway.

5. The dedicated access module of claim 2, wherein the connector comprises a slidable component housed in a recess in one or both mating portions.

6. The dedicated access module of claim 2, wherein the connector comprises a rotating insert that interleaves with the first set of articulatable hinge elements and a locking base.

7. The dedicated access module of claim 2, wherein the connector comprises a detent extending from a flexible planar portion of the first mating portion that is received in a groove on the second mating portion.

8. The dedicated access module of claim 1, wherein the first mating portion and second mating portion snap fit together to form the complete dedicated access module.

9. The dedicated access module of claim 1, wherein the first non-articulatable connection element comprises a T-shaped protrusion and the second non-articulatable connection element comprises a recess that is complementary to the T-shaped protrusion and configured to receive the T-shaped protrusion.

10. The dedicated access module of claim 1, wherein the first mating portion and second mating portion are identical to each other.

11. The dedicated access module of claim 1, wherein the first non-articulatable connection element comprises a series of spaced apart protrusions, each protrusion including a tip extending upwards and a recess on a bottom portion of the protrusion complementary to the tip.

12. The dedicated access module of claim 1, wherein the inner ends are angled.

13. The dedicated access module of claim 1, wherein the first non-articulatable connection element comprises spaced apart, non-articulating connecting protrusions extending from the inner end and the second non-articulatable connection element includes openings between solid sections that are configured to receive the connecting protrusions of the first mating portion.

14. The dedicated access module of claim 1, wherein the first mating portion includes shaped protrusions on a bottom surface configured to be received in shaped openings on an upper surface of the second mating portion.

15. The dedicated access module of claim 14, wherein the first mating portion includes a laterally-extending protrusion on the bottom surface and the second mating portion includes a laterally-extending channel in the upper surface for receiving the laterally-extending protrusion.

16. The dedicated access module of claim 1, wherein the first mating portion includes a hook, and the second mating portion includes a receptable for the hook.

17. The dedicated access module of claim 16, wherein the first mating portion further includes flexible projections that engage flexible projections in a groove on the second mating portion.

18. The dedicated access module of claim 1, wherein:
   the first mating portion includes a bottom surface forming a drive tooth and an upper surface including a recess with a T-shaped protrusion; and
   the second mating portion includes a substantially flat top surface and a bottom surface including a T-shaped recess for receiving the T-shaped protrusion, wherein the T-shaped recess is longer than the T-shaped protrusion.

19. The dedicated access module of claim 18, further comprising a compression spring for biasing the mating portions into engagement.

20. A conveyor belt comprising:
   a plurality of hingedly connected standard hinge modules, each having a drive element at a selected pitch for engaging a drive to drive the conveyor belt;
   a dedicated access module comprising two mating portions joined together via a non-articulatable connection means, the dedicated access module having first articulatable hinge elements on a first end for connecting to a first standard hinge module, second articulatable hinge elements on a second end for connecting to a second standard hinge module and a drive element at the selected pitch.

21. The conveyor belt of claim 20, wherein the standard hinge modules are a first color, and the dedicated access module is a different color.

* * * * *